(12) United States Patent
Banning

(10) Patent No.: US 7,485,728 B2
(45) Date of Patent: Feb. 3, 2009

(54) COLORANT COMPOUNDS

(75) Inventor: Jeffrey H. Banning, Hillsboro, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/702,758

(22) Filed: Feb. 6, 2007

(65) Prior Publication Data
US 2008/0188662 A1 Aug. 7, 2008

(51) Int. Cl.
C07D 211/26 (2006.01)
C07D 211/32 (2006.01)
(52) U.S. Cl. .................................................. 546/226
(58) Field of Classification Search ................ 552/208; 546/102, 226, 233
See application file for complete search history.

(56) References Cited

U.S. PATENT DOCUMENTS

| | | | | |
|---|---|---|---|---|
| 1,981,515 | A | 11/1934 | Kyrides | 562/58 |
| 1,981,516 | A | 11/1934 | Kyrides | 562/58 |
| 1,991,482 | A | 2/1935 | Allemann | 8/658 |
| 3,653,932 | A | 4/1972 | Berry et al. | 106/31.29 |
| 4,390,369 | A | 6/1983 | Merritt et al. | 106/31.3 |
| 4,484,948 | A | 11/1984 | Merritt et al. | 106/31.3 |
| 4,647,675 | A | 3/1987 | Mayer et al. | 549/394 |
| 4,684,956 | A | 8/1987 | Ball | 347/88 |
| 4,851,045 | A | 7/1989 | Taniguchi | 106/31.31 |
| 4,889,560 | A | 12/1989 | Jaeger et al. | 106/31.29 |
| 4,889,761 | A | 12/1989 | Titterington et al. | 428/32.1 |
| 4,935,059 | A | 6/1990 | Mayer et al. | 106/31.43 |
| 5,006,170 | A | 4/1991 | Schwarz et al. | 106/31.3 |
| 5,013,857 | A | 5/1991 | Berneth et al. | 552/110 |
| 5,084,099 | A | 1/1992 | Jaeger et al. | 106/31.29 |
| 5,151,120 | A | 9/1992 | You et al. | 106/31.29 |
| 5,221,335 | A | 6/1993 | Williams et al. | 524/560 |
| 5,372,852 | A | 12/1994 | Titterington et al. | 427/288 |
| 5,496,879 | A | 3/1996 | Griebel et al. | 524/320 |
| 5,507,864 | A | 4/1996 | Jaeger et al. | 106/31.32 |
| 5,621,022 | A | 4/1997 | Jaeger et al. | 523/161 |
| 5,747,554 | A | 5/1998 | Sacripante et al. | 523/161 |
| 5,782,966 | A | 7/1998 | Bui et al. | 106/31.43 |
| 5,847,162 | A | 12/1998 | Lee et al. | 549/227 |
| 5,902,841 | A | 5/1999 | Jaeger et al. | 523/161 |
| 6,174,937 | B1 | 1/2001 | Banning et al. | 523/160 |
| 6,309,453 | B1 | 10/2001 | Banning et al. | 106/31.29 |
| 6,860,931 | B2 | 3/2005 | Wu et al. | 106/31.29 |

FOREIGN PATENT DOCUMENTS

| | | |
|---|---|---|
| DE | 1232098 | 5/1971 |
| EP | 0187352 | 7/1986 |
| EP | 0206286 | 12/1986 |
| EP | 1 650 269 | 4/2006 |
| GB | 421737 | 12/1934 |
| GB | 1141147 | 1/1969 |
| GB | 2311075 | 9/1997 |
| WO | WO 94/04619 | 3/1994 |
| WO | WO 98/49143 | 11/1998 |

OTHER PUBLICATIONS

U.S. Patent Application filed Feb. 6, 2007, of Jeffrey Banning, entitled "Phase Change Inks Containing Colorant Compounds" 99 pages, not yet published.

(Continued)

(Continued)

*Primary Examiner*—D. Margaret Seaman
*Assistant Examiner*—Nizal S Chandrakumar
(74) *Attorney, Agent, or Firm*—Marylou J. Lavoie, Esq.

(57) ABSTRACT

A compound of the formula

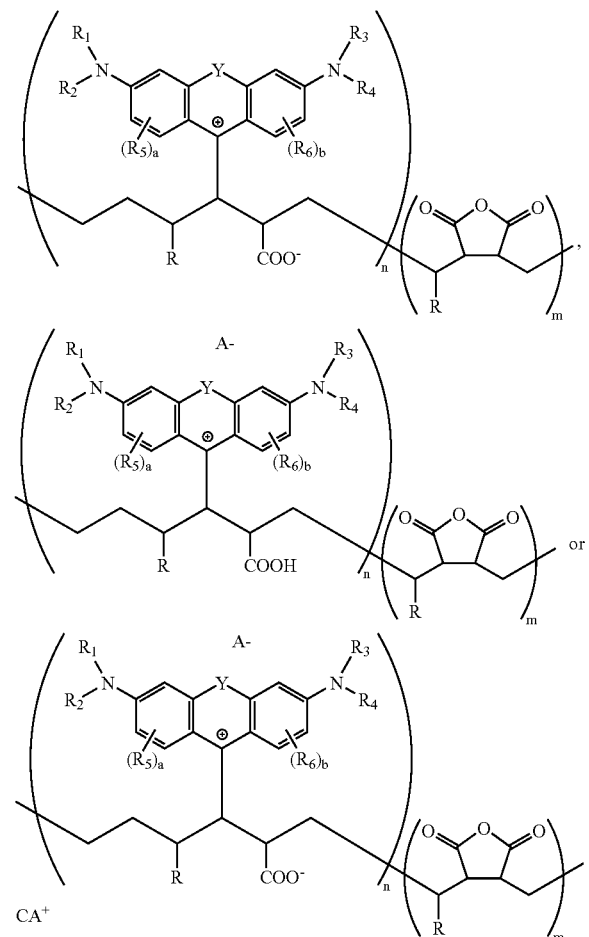

wherein $R_1$, $R_2$, $R_3$, $R_4$, $R_5$, $R_6$, R, Y, CA, $A^-$, m and n each, independently of the others are as defined herein.

13 Claims, No Drawings

OTHER PUBLICATIONS

U.S. Patent Application filed Feb. 6, 2007, of Jeffrey Banning, entitled "Colorant Compounds" 93 pages, not yet published.

U.S. Patent Application filed Feb. 6, 2007, of Jeffrey Banning, entitled "Phase Change Inks Containing Colorant Compounds" 95 pages, not yet published.

U.S. Appl. No. 10/607,382, filed Jun. 26, 2003, of Jeffrey H. Banning et al., entitled "Colorant Compounds", published Jan. 20, 2005.

English Abstract for German Patent Publication DE 4205636AL, Aug. 1993.

English Abstract for German Patent Publication DE 4205713AL, Mar. 1996.

English abstract for Japanese Patent Publication JP 61221265, Oct. 1986.

Rhodamine Dyes and Related Compounds, "IV. Aryl- and Benzylrhodamines," I. S. IOFFE et al., translated from Zhurnal Obschei Khimii, vol. 32, No. 4, (May 1962), pp. 1480-1485.

Rhodamine Dyes and Related Compounds, "XV. Rhodamine Dyestuffs with Hydroaromatic and Polymethylene Radicals," I. S. IOFFE et al., translated from Zhurnal Obschei Khimii, vol. 1, No. 3, (Mar. 1965), pp. 584-586.

Rhodamine Dyes and Related Compounds, "XVI. Butylrhodamines," I. S. IOFFE et al., translated from Zhurnal Obschei Khimii, vol. 1, No. 12, (Dec. 1965), pp. 2172-2176.

Rhodamine Dyes and Related Compounds, "XXI. Mutual Conversions of the Colorless and Colored Forms of N,N'-Substituted Rhodamines," I. S. IOFFE et al., translated from Zhumal Obschei Khimii, vol. 1, No. 12, (1972), pp. 1765-1767.

"Tautomerism of Rhodamines," Mchedlov-Petrosyan et al., translated from Zhurnal Obshchei Khimii, vol. 61, No. 1, pp. 225-2333, Jan. 1991., et al.; USSR. Vestn. Khark'k. Univ. (1989), 340 pp. 3-4, CODEN: VKSGA3 ISSN: 0453-8048. Journal; General Review written in Russian.

"Ionization and Tautomerizationof Xanthene Dyes in Mixtures of Water with Dimethyl Sulfoxide," Mchedlov-Petrosyan et al., translated from Zhurnal Obshchei Khimii, vol. 61, No. 1, pp. 225-2333, Jan. 1991.

"Structural Conversions of Rhodamines in Solution," Mchedlov-Petrosyan et al., translated from Izvestiya Akademii Nauk, Seriya Khimicheskaya, No. 3, pp. 512-521, Mar. 1992.

"Efficient Synthesis of Rhodamine Cnjugates through the 2'-position," Grote et al., Biorganic & Medicinal Chemistry Letters 10 (2000), pp. 1539-1541.

"Characterization of the Chromophore Orientation of Rhodaine B Amphiphiles in Langmuir-Blodgett Monolayers," Ishibashi et al., J. Colloid Interface Sci. (2001), Abstract Only.

European Search Report, European Patent Application No. EP 08 150 178.5, dated Jun. 20, 2008, 7 pages.

Schmidt et al., "Modification of Poly(octadecene-alt-maleic anhydride) Films by Reaction with Functional Amines", Journal of Applied Polymer Science, vol. 87, pp. 1255-1266 (2003).

COLORANT COMPOUNDS

CROSS-REFERENCE IS MADE TO THE FOLLOWING CO-PENDING APPLICATIONS

Co-pending Application U.S. Ser. No. 11/702,875, filed concurrently herewith, entitled "Phase Change Inks Containing Colorant Compounds," with the named inventor Jeffery H. Banning, the disclosure of which is totally incorporated herein by reference, discloses a phase change ink composition comprising a phase change ink carrier and a colorant compound of the formula Co-pending Application U.S. Ser. No. 11/702,757, filed concurrently herewith, entitled "Colorant Compounds," with the named inventor Jeffery H. Banning, the disclosure of which is totally incorporated herein by reference, and Co-pending Application U.S. Ser. No. 11/702,932, filed concurrently herewith, entitled "Phase Change Inks Containing Colorant Compounds," with the named inventor Jeffery H. Banning, the disclosure of which is totally incorporated herein by reference, discloses a phase change ink composition comprising a phase change ink carrier and a colorant compound of the formula

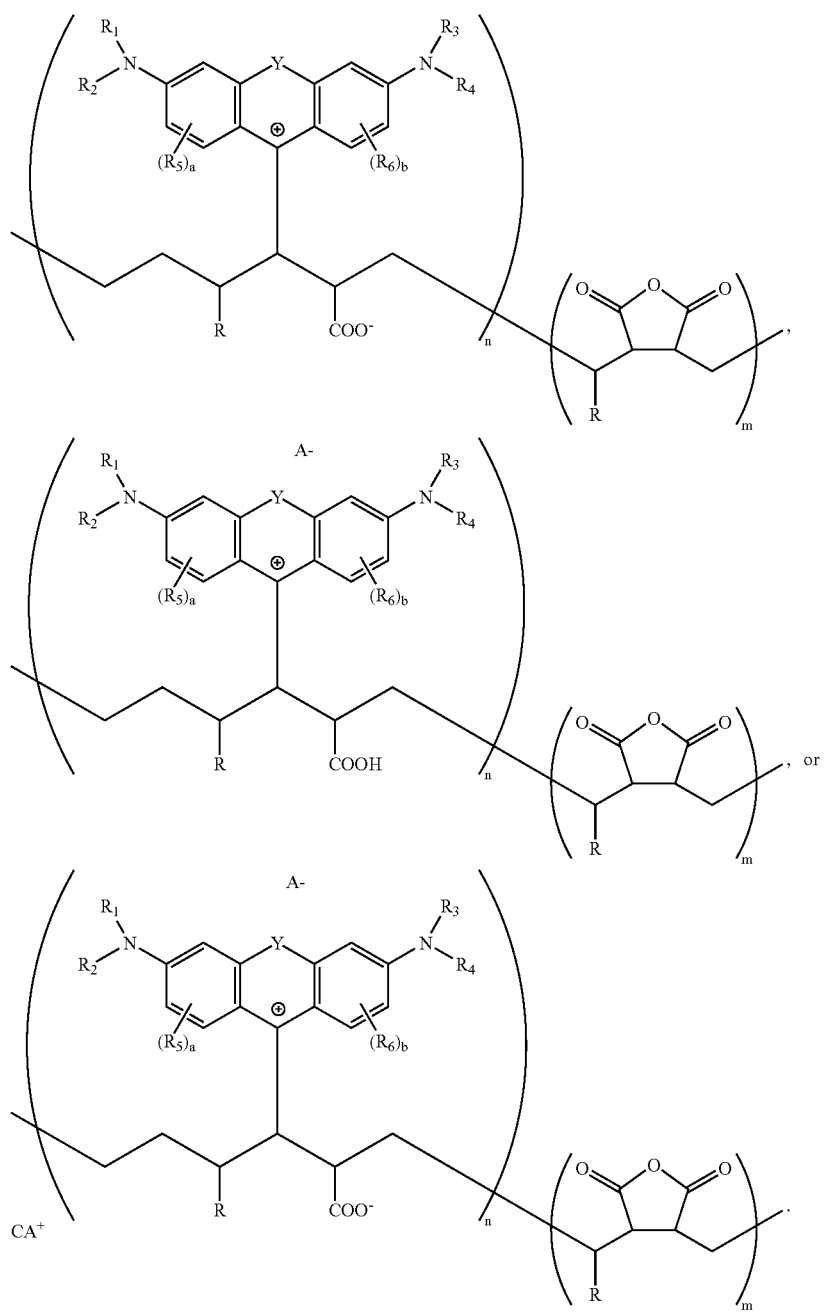

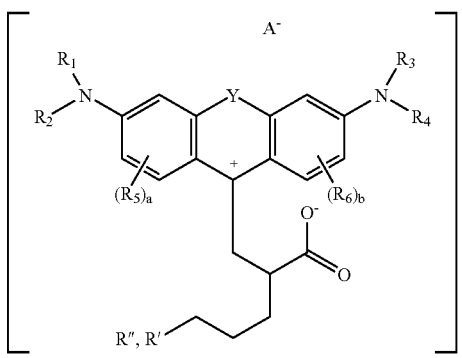
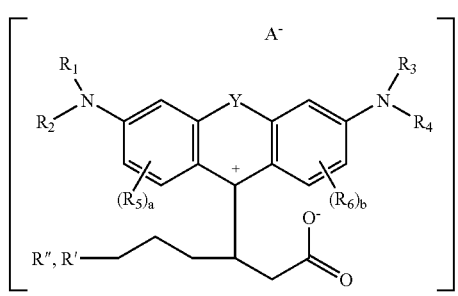
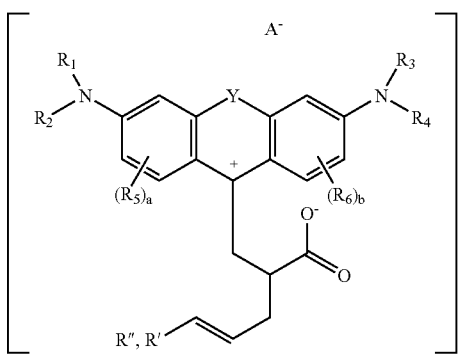
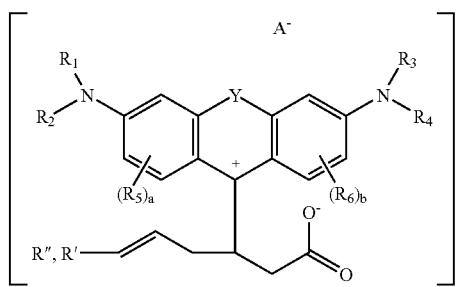
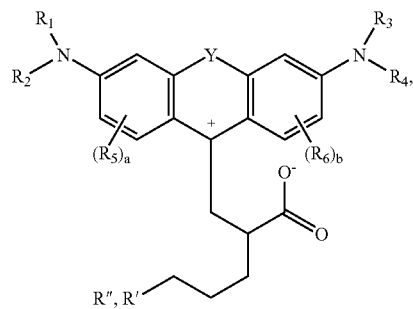
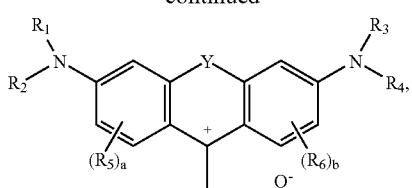
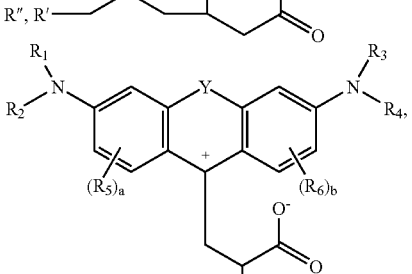
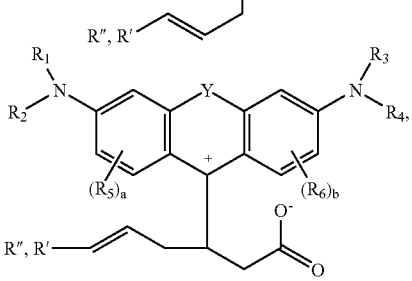
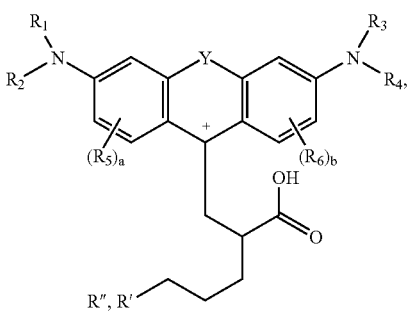
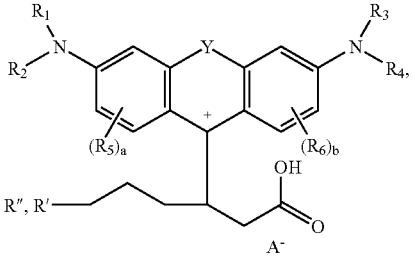
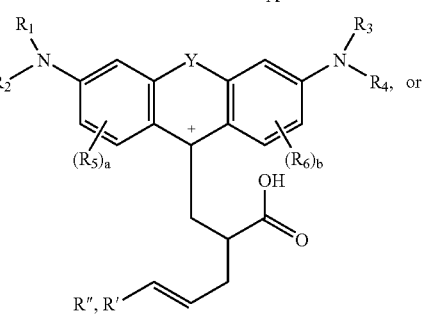

-continued
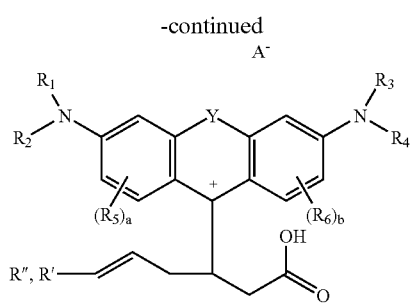
BACKGROUND
The present disclosure is generally related to colorant compounds. More specifically, the present disclosure is directed to colorant compounds particularly suitable for use in hot melt or phase change inks. One embodiment of the present disclosure is directed to a compound of the formula
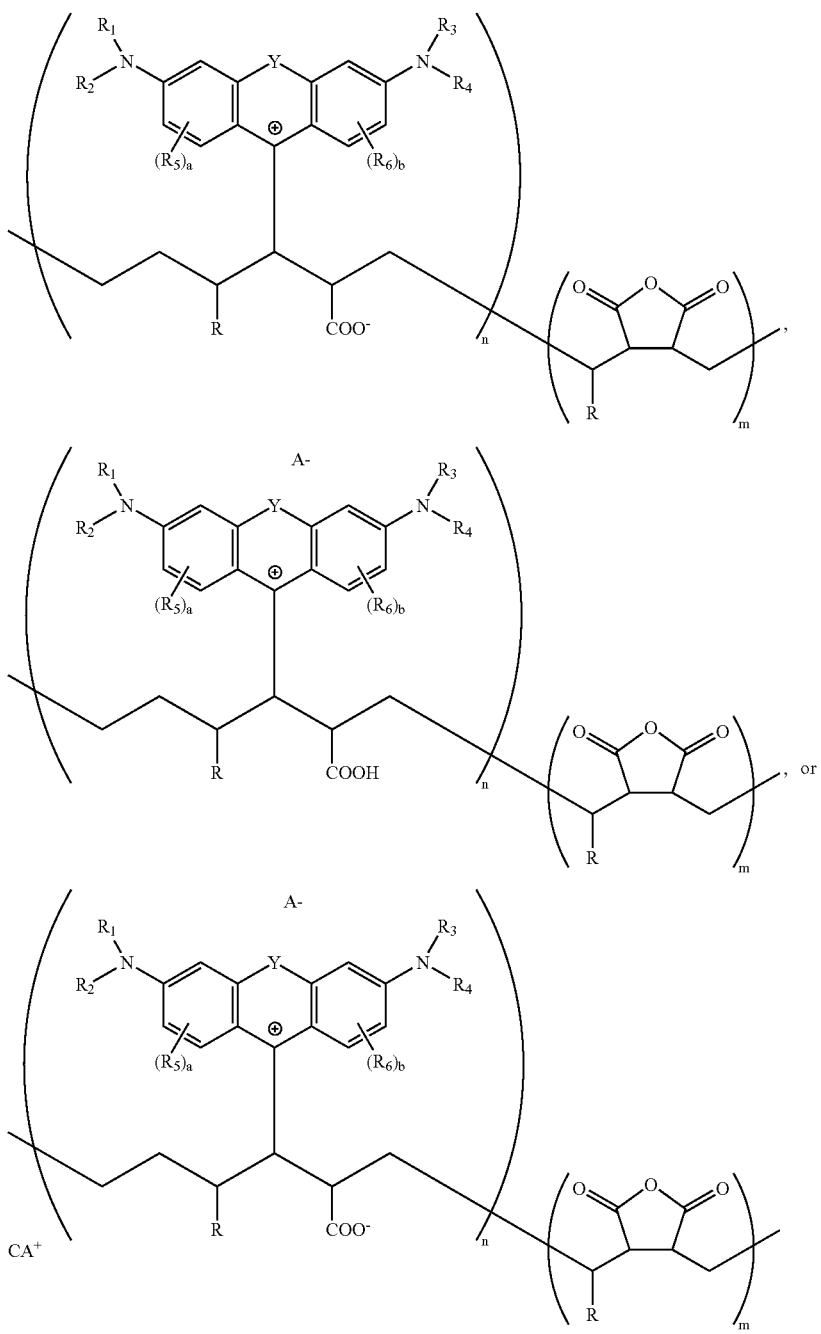

wherein $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure; wherein a and b each, independently of the others, is an integer which is 0, 1, 2, or 3, wherein each $R_5$, and $R_6$ independently of the other, is (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, (xxxvi) a urea group, or (xxxvii) hydrogen, wherein $R_5$ and $R_6$ can each be joined to a phenyl ring in the central structure,

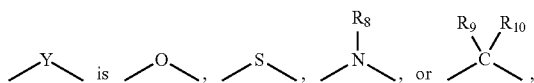

wherein $R_8$, $R_9$, and $R_{10}$ each, independently of the other, is (i) a hydrogen atom, (ii) an alkyl group, (iii) an aryl group, (iv) an arylalkyl group, or (v) an alkylaryl group;

wherein R is (i) an alkyl group, (ii) an aryl group, (iii) an arylalkyl group, or (iv) an alkylaryl group, wherein R if an alkyl group has from about 1 to about 100 carbon atoms, or about 18 to about 33 carbon atoms, or about 30 carbon atoms, or about 50 carbon atoms, wherein R if an aryl group has from about 5 to about 20 carbon atoms, or about 6 carbon atoms or about 10 carbon atoms, wherein R if an alkylaryl group has from about 7 carbon atoms, or about 30 carbon atoms, or about 50 carbon atoms or about 100 carbon atoms, wherein R if an arylalkyl group has from about 7 carbon atoms, or about 30 carbon atoms, or about 50 carbon atoms, or about 100 carbon atoms, wherein in embodiments, R is a waxy chain, waxy as used herein meaning containing at least about 10 carbon atoms, or at least about 18 carbon atoms, or from about 18 to about 100 carbon atoms, or from about 18 to about 33 carbon atoms, wherein in embodiments R is $C_6H_5$ (phenyl), wherein in embodiments R is $CH_2CH_2$ (ethylene), wherein in embodiments R is OH, wherein in embodiments R is O—R (alkoxy), for example, in embodiments, R is O—$CH_3$ (methoxy), wherein in embodiments R is OAc, wherein OAc refers to any acetate moiety, and wherein in embodiments R is a co-polymer of maleic anhydride;

wherein n is an integer which is about 1 to about 1000, or about 1 to about 20 or at least about 4, or at least about 12, or at least 50, and where m is an integer which is about 1 to about 1000, or about 1 to about 20, or at least about 4, or at least about 12, or at least about 50.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. Nos. 3,653,932, 4,390,369, 4,484,948, 4,684,956, 4,851,045, 4,889,560, 5,006,170, 5,151,120, 5,372,852, 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

British Patent Publication GB 2 311 075 (Gregory et al.), the disclosure of which is totally incorporated herein by reference, discloses a compound of the formula

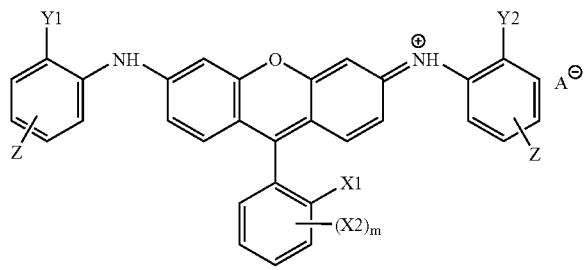

wherein X1 is an ester group or an amide group (such as of a carboxylic or sulfonic acid) or a fatty amine salt of a sulfonic acid, each X2 independently is a substituent, m has a value of from 0 to 2, Y1 and Y2 are each independently H, alkyl, or halo, each Z independently is an ester or amide group, and A- is an anion. The compound is useful as a colorant for toners, D2T2 printing, plastics, polyesters, nylons, and inks, especially ink jet or hot melt inks.

U.S. Pat. No. 1,991,482 (Allemann), the disclosure of which is totally incorporated herein by reference, discloses a process of producing rhodamine dyes which comprises condensing a halogenated primary amine of the benzene series with fluorescein dichloride and sulfonating the condensed product.

U.S. Pat. No. 5,013,857 (Bemeth et al.), the disclosure of which is totally incorporated herein by reference, discloses a process for the preparation of sulpho-free triphenyl-methane dyestuffs.

U.S. Pat. No. 5,847,162 (Lee et al.), the disclosure of which is totally incorporated herein by reference, discloses a class of 4,7-dichlororhodamine compounds useful as fluorescent dyes having the structure

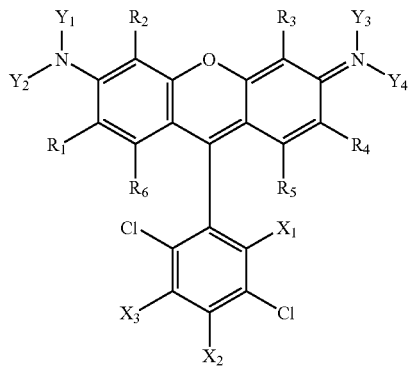

wherein $R_1$-$R_6$ are hydrogen, fluorine, chlorine, lower alkyl lower alkene, lower alkyne, sulfonate, sulfone, amino, amido, nitrile, lower alkoxy, lining group, or combinations thereof or, when taken together, $R_1$ and $R_6$ is benzo, or, when taken together, $R_4$ and $R_5$ is benzo; $Y_1$-$Y_4$ are hydrogen or lower alkyl or, when taken together, $Y_1$ and $R_2$ is propano and $Y_2$ and $R_1$ is propano, or, when taken together, $Y_3$ and $R_3$ is propano and $Y_4$ and $R_4$ is propano; and $X_1$-$X_3$ taken separately are selected from the group consisting of hydrogen, chlorine, fluorine, lower alkyl carboxylate, sulfonic acid, —CH$_2$OH, and linking group. In another aspect, the disclosure includes reagents labeled with the 4,7-dichlororhodamine dye compounds, including deoxynucleotides, dideoxynucleotides, and polynucleotides. In an additional aspect, the disclosure includes methods utilizing such dye compounds and reagents including dideoxy polynucleotide sequencing and fragment analysis methods.

U.S. Pat. No. 4,935,059 (Mayer et al.), the disclosure of which is totally incorporated herein by reference, discloses basic rhodamine dyes suitable for use in recording fluids for the ink jet process and for coloring paper stock having the formula

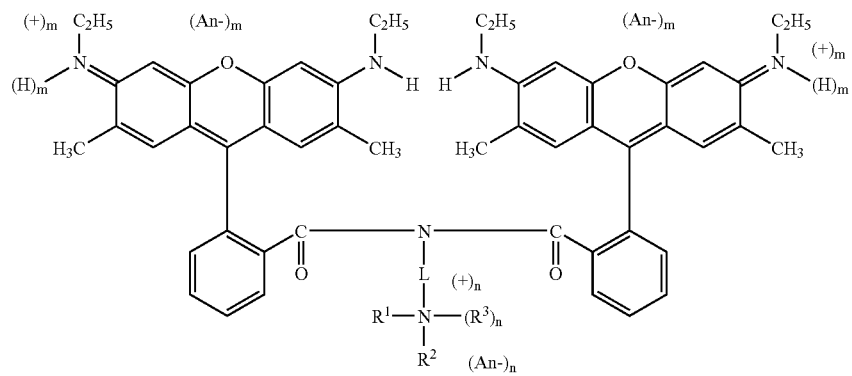

where L is $C_2$-$C_{10}$-alkylene, $R_1$, $R_2$, and $R_3$ are each independently of the others hydrogen, substituted or unsubstituted $C_1$-$C_{10}$-alkyl or $C_5$-$C_7$-cycloalkyl or $R_1$ and $R_2$ together with the nitrogen atom linking them together are a heterocyclic radical, An- is one equivalent of an anion and m and n are each independently of the other 0 or 1.

U.S. Pat. No. 4,647,675 (Mayer et al.), the disclosure of which is totally incorporated herein by reference, discloses compounds of the general formula

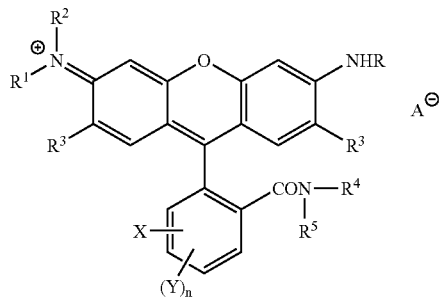

where A- is an anion, R is hydrogen or unsubstituted or substituted alkyl or cycloalkyl, $R_1$ and $R_2$ independently of one another are each hydrogen or unsubstituted or substituted alkyl or cycloalkyl, or one of the radicals may furthermore be aryl, or $R_1$ and $R_2$, together with the nitrogen atom, form a saturated heterocyclic structure, the radicals $R_3$ independently of one another are each hydrogen or $C_1$-$C_4$-alkyl, $R_4$ and $R_5$ independently of one another are each unsubstituted or substituted alkyl or cycloalkyl, or one of the radicals may furthermore be hydrogen, aryl or hetaryl, $R_4$ and $R_5$, together with the nitrogen atom, form a saturated heterocyclic structure, n is 1, 2 or 3, X is hydrogen, chlorine, bromine, $C_1$-$C_4$-alkyl, $C_1$-$C_4$-alkoxy or nitro and Y is hydrogen or chlorine, are particularly useful for dyeing paper stocks.

U.S. Pat. No. 1,981,515 (Kyrides), the disclosure of which is totally incorporated herein by reference, discloses intermediates for rhodamine dyestuffs.

U.S. Pat. No. 1,981,516 (Kyrides), the disclosure of which is totally incorporated herein by reference, discloses intermediates for secondary alkylated rhodamine dyes.

British Patent Publication GB 421 737, the disclosure of which is totally incorporated herein by reference, discloses dyes of the rhodamine series which are prepared by condensing naphthalene-2:3-dicarboxylic acid with a m-aminophenol in which the nitrogen group is substituted by one or two alkyl groups, the products, if desired, being sulphonated. The unsulphonated products may be used as lake colouring matters whilst the sulphonated dyes are acid wool dyes. In examples, (1) naphthalene-2:3-dicarboxylic acid is condensed with diethyl-m-aminophenol in the presence of zinc chloride giving a product which dyes tannin-mordanted cotton in the same shade as Rhodamine B and a sulphonated product which dyes wool bluish-red shades; (2) monoethyl-m-aminophenol is used instead of the diethyl-m-aminophenol in example (1), yielding a dye, which when sulphonated dyes wool red-orange shades; (3) 2-ethylamino-p-cresol replaces the diethyl-m-aminophenol in example (1), yielding a dye dyeing and printing tannin-mordanted cotton in shades similar to Rhodamine 69BS and when sulphonated dyeing wool red.

Japanese Patent Publication JP 61221265, the disclosure of which is totally incorporated herein by reference, discloses rhodamine compounds of formula I

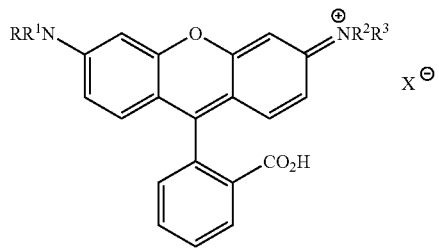

wherein $R_1$, $R_3$ are each lower alkyl; $R_2$ is lower alkyl, 10 C or higher long-chain alkyl; $R_4$ is 10 C or higher long-chain alkyl; X— is an anion, or squarylium compounds of formula II

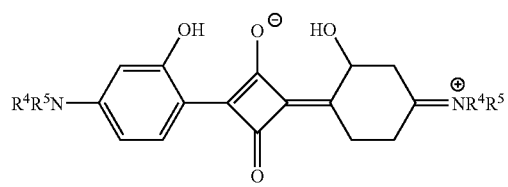

wherein $R_2$ is 10 C or higher long-chain alkyl. Example: 3,6-(N,N'-diethyl-N,N'-dioctadecyl)diamino-9-(2-carboxyphenyl)xanthilium perchlorate. Use: materials for molecular electronics, which are suitable for use as materials for photoelectric converter, optical memory, etc. Preparation: 2-(4-N,N'-diethylamino-2-hydroxybenzoyl)-benzoic acid, which is a condensate between N-ethyl-N-octadecyl-m-hydroxyaniline and phthalic anhydride, is reacted with N-ethyl-N-octadecyl-m-hydroxyaniline to obtain the compound of formula I. 3-$HOC_6H_4N(Et)(CH_2)_{17}Me$ and phthalic anhydride were heated at 150° for 4 hours, treated with aqueous $NH_3$, and the amorphous intermediate mixed with aqueous $HClO_4$ forming a compound of formula I (R=$R_2$=Et; $R_1$=$R_3$=$C_{18}H_{37}$; X=$ClO_4$), having λmax (MeOH) 550 nm.

U.S. Pat. No. 5,084,099 (Jaeger et al.), the disclosure of which is totally incorporated herein by reference, discloses modified phase change ink compatible colorants which comprise a phase change ink soluble complex of (a) a tertiary alkyl primary amine and (b) dye chromophores, i.e., materials that absorb light in the visible wavelength region to produce color having at least one pendant acid functional group in the free acid form (not the salt of that acid). These modified colorants are extremely useful in producing phase change inks when combined with a phase change ink carrier, even though the unmodified dye chromophores have limited solubility in the phase change ink carrier. Thin films of uniform thickness of the subject phase change ink compositions which employ the modified phase change ink colorants exhibit a high degree of lightness and chroma. The primary amine-dye chromophore complexes are soluble in the phase change ink carrier and exhibit excellent thermal stability.

U.S. Pat. No. 5,507,864 (Jaeger et al.), the disclosure of which is totally incorporated herein by reference, discloses a phase change ink composition that includes a combination of different dye types such as an anthraquinone dye and a xanthene dye, which is most preferably a rhodamine dye. While each dye type is insufficiently soluble with respect to favored carrier compositions to preserve color saturation in reduced ink quantity prints, the dye type combination permits increased dye loading and maintains print quality. In a preferred embodiment of the disclosure, a favored carrier composition is adjusted to promote the colored form of a preferred rhodamine dye (C.I. Solvent Red 49) and mixed with a preferred anthraquinone dye (C.I. Solvent Red 172) whose concentration is kept below a critical level to prevent post printed blooming. The resulting preferred phase change ink compositions provide a magenta phase change ink with enhanced light fastness and color saturation, as well as good compatibility with preferred existing subtractive primary color phase change inks.

U.S. Pat. No. 5,621,022 (Jaeger et al.), the disclosure of which is totally incorporated herein by reference, discloses a phase change ink composition wherein the ink composition utilizes polymeric dyes in combination with a selected phase change ink carrier composition.

U.S. Pat. No. 5,747,554 (Sacripante et al.), the disclosure of which is totally incorporated herein by reference, discloses an ink composition comprising a polyesterified-dye (I) or polyurethane-dye (II) with a viscosity of from about 3 centipoise to about 20 centipoise at a temperature of from about 125° C. to about 165° C. and represented by the formulas

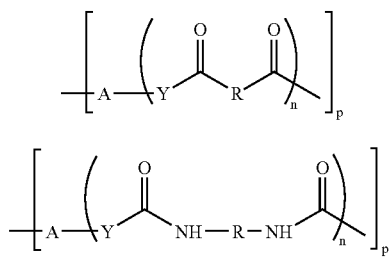

wherein A is an organic chromophore, Y is an oxyalkylene or poly(oxyalkylene), R is an arylene or alkylene, n represents the number of repeating segments, and is an integer of from about 2 to about 50, and p represents the number of chains per chromophore and is an integer of from about 1 to about 6.

U.S. Pat. No. 5,902,841 (Jaeger et al.), the disclosure of which is totally incorporated herein by reference, discloses a phase change ink composition wherein the ink composition utilizes colorant in combination with a selected phase change ink carrier composition containing at least one hydroxy-functional fatty amide compound.

U.S. patent application Ser. No. 10/607,382, filed Jun. 26, 2003, published Jan. 20, 2005, of Jeffrey H. Banning et al., and U.S. Pat. No. 6,860,931 of Jeffrey H. Banning et al., the disclosures of each of which are totally incorporated by reference herein, disclose in embodiments compounds of the formulae

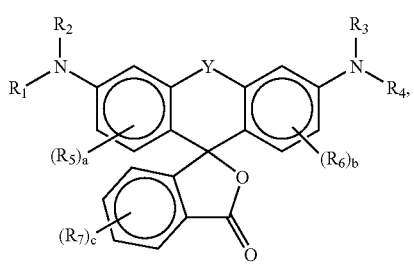

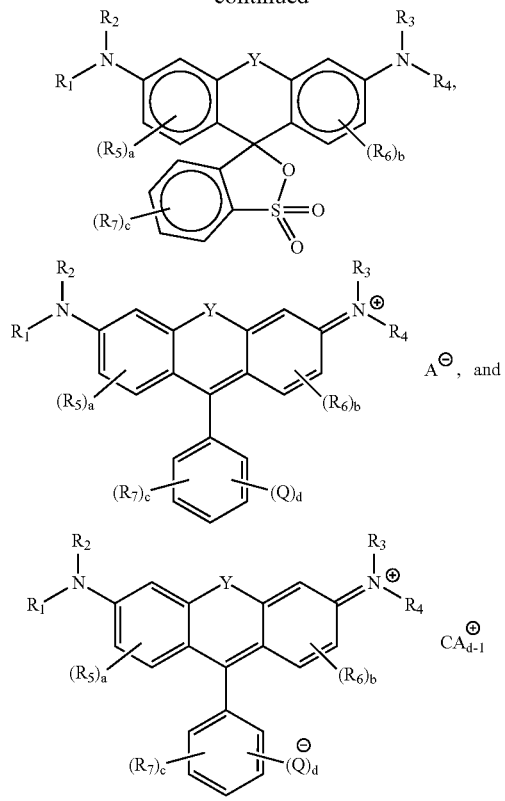

wherein R1, R2, R3, and R4 each, independently of the others, is (i) a hydrogen atom, (ii) an alkyl group, (iii) an aryl group, (iv) an arylalkyl group, or (v) an alkylaryl group, wherein R1 and R2 can be joined together to form a ring, wherein R3 and R4 can be joined together to form a ring, and wherein R1, R2, R3, and R4 can each be joined to a phenyl ring in the central structure, a and b each, independently of the others, is an integer which is 0, 1, 2, or 3, c is an integer which is 0, 1, 2, 3, or 4, each R5, R6, and R7, independently of the others, is (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein R5, R6, and R7 can each be joined to a phenyl ring in the central structure, R8, R9, and R10 each, independently of the others, is (i) a hydrogen atom, (ii) an alkyl group, (iii) an aryl group, (iv) an arylalkyl group, or (v) an alkylaryl group, provided that the number of carbon atoms in R1+R2+R3+R4+R5+R6+R7+R8+R9+R10 is at least about 16, each Q, independently of the others, is a COOH group or a SO3H group, each Q-, independently of the others, is a COO— group or a SO3- group, d is an integer which is 1, 2, 3, 4, or 5, A is an anion, and CA is either a hydrogen atom or a cation associated with all but one of the Q- groups, provided that when

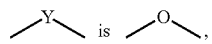

at least one of the following of (a), (b), and (c) is true: (a) the number of carbon atoms in R1+R2+R3+R4 is at least about 42, (b) at least one of R1, R2, R3, and R4 is a group of the formula

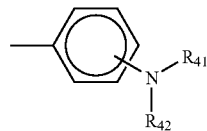

wherein R41 and R42 each, independently of the other, is an alkyl group, an aryl group, an arylalkyl group, or an alkylaryl group, or (c) at least one of R1, R2, R3, and R4 is a branched alkyl group having at least about 19 carbon atoms.

While known compositions and processes are suitable for their intended purposes, a need remains for new magenta colorant compositions. In addition, a need remains for magenta colorant compositions particularly suitable for use in phase change inks. Further, a need remains for magenta colorants with desirable thermal stability. Additionally, a need remains for magenta colorants that exhibit minimal undesirable discoloration when exposed to elevated temperatures. There is also a need for magenta colorants that exhibit a desirable brilliance. In addition, there is a need for magenta colorants that exhibit a desirable hue. Further, there is a need for magenta colorants that are of desirable chroma. Additionally, there is a need for magenta colorants that have desirably high lightfastness characteristics. A need also remains for magenta colorants that have a desirably pleasing color. In addition, a need remains for magenta colorants that exhibit desirable solubility characteristics in phase change ink carrier compositions. Further, a need remains for magenta colorants that enable phase change inks to be jetted at temperatures of over 135° C. while maintaining thermal stability. Further, a need remains for magenta colorants for use in solid ink printers that operate with lower print head temperatures much lower than 135° C. as well as in ultraviolet radiation curable systems. Additionally, a need remains for magenta colorants that enable phase change inks that generate images with low pile height. There is also a need for magenta colorants that enable phase change inks that generate images that approach lithographic thin image quality. In addition, there is a need for magenta colorants that exhibit oxidative stability. Further, there is a need for magenta colorants that do not precipitate from phase change ink carriers. Additionally, there is a need for magenta colorants that do not, when included in phase change inks, diffuse into adjacently printed inks of different colors. A need also remains for magenta colorants that do not leach from media such as phase change ink carriers into tape adhesives, paper, or the like. In addition, a need remains for magenta colorants that, when incorporated into phase change inks, do not lead to clogging of a phase change ink jet printhead. Further, there is a need for magenta colorants that enable phase change inks that generate images with sharp edges that remain sharp over time. Additionally, there is a need for magenta colorants that enable phase change inks that generate images which retain their high image quality in warm climates. Further, there is a need for magenta colorants that enable phase change inks that generate images of desirably high optical density. Additionally, there is a need for magenta colorants that, because of their good solubility in phase change ink carriers, enable the generation of images of low pile height without the loss of desirably high optical density. A need also remains for magenta colorants that enable cost-effective inks.

The appropriate components and process aspects of the each of the foregoing may be selected for the present disclosure in embodiments thereof.

SUMMARY

The present disclosure is directed to a compound of the formula

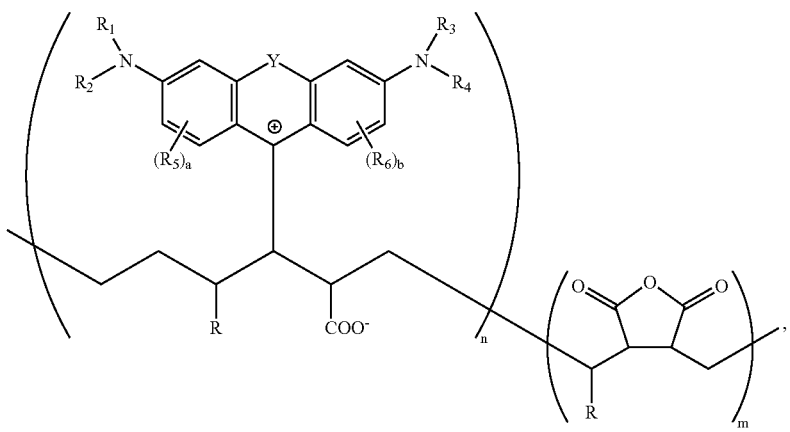

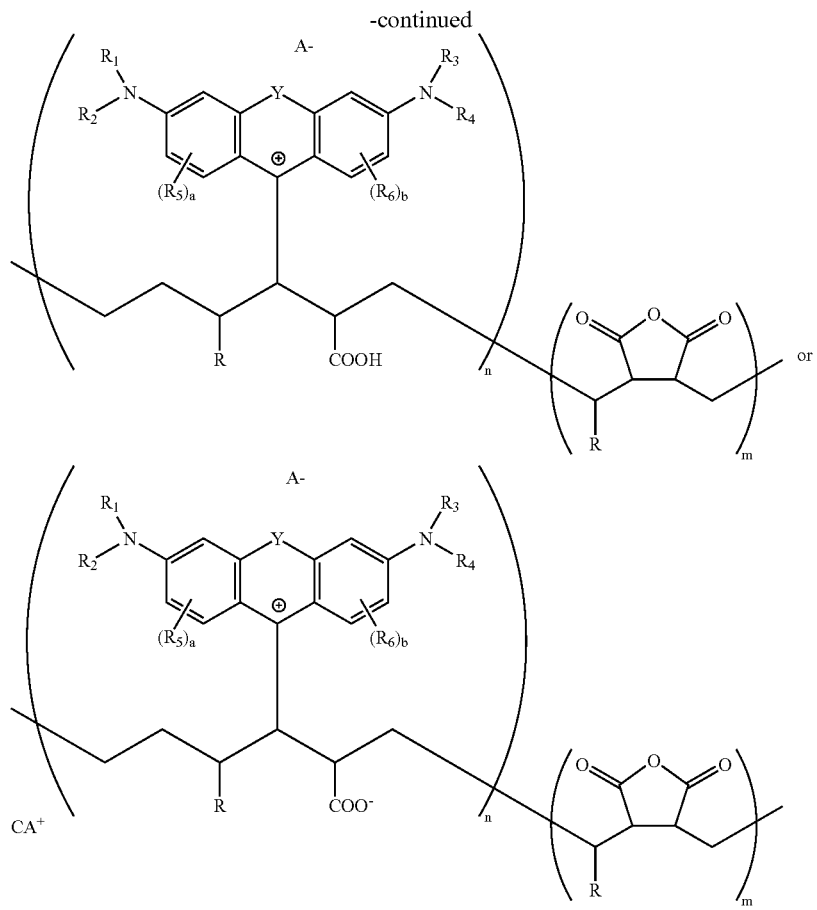

wherein $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure;

wherein a and b each, independently of the others, is an integer which is 0, 1, 2, or 3, wherein each $R_5$, and $R_6$ independently of the other, is (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, (xxxvi) a urea group, or (xxxvii) hydrogen, wherein $R_5$ and $R_6$ can each be joined to a phenyl ring in the central structure, $\diagup Y \diagdown$ is $\diagup O \diagdown$, $\diagup S \diagdown$, $\diagup \underset{\underset{R_8}{|}}{N} \diagdown$, or $\diagup \underset{\underset{R}{|}}{\overset{\overset{R_9}{|}}{C}} \diagdown R_{10}$, wherein $R_8$, $R_9$, and $R_{10}$ each, independently of the other, is (i) a hydrogen atom, (ii) an alkyl group, (iii) an aryl group, (iv) an arylalkyl group, or (v) an alkylaryl group;

wherein R is (i) an alkyl group, (ii) an aryl group, (iii) an arylalkyl group, or (iv) an alkylaryl group, (v) an alkoxy group, (vi) an acetate group, or (vii) a co-polymer of maleic anhydride;

wherein n is an integer which is about 1 to about 1000, and where m is an integer which is about 1 to about 1000;

wherein A is an anion; and wherein CA is either a hydrogen atom or a cation.

In embodiments, R if an alkyl group has from about 1 to about 100 carbon atoms, or about 18 to about 33 carbon atoms, or about 30 carbon atoms, or about 50 carbon atoms, wherein R if an aryl group has from about 5 to about 20 carbon atoms, or about 6 carbon atoms or about 10 carbon atoms, wherein R if an alkylaryl group has from about 7 carbon atoms, or about 30 carbon atoms, or about 50 carbon atoms, or about 100 carbon atoms, wherein R if an arylalkyl group has from about 7 carbon atoms, or about 30 carbon atoms, or about 50 carbon atoms, or about 100 carbon atoms, wherein in embodiments, R is a waxy chain, waxy as used herein meaning containing at least about 10 carbon atoms, or at least about 18 carbon atoms, or from about 18 to about 100 carbon atoms, or from about 18 to about 33 carbon atoms, wherein in embodiments R is $C_6H_5$ (phenyl), wherein in embodiments R is $CH_2CH_2$ (ethylene), wherein in embodiments R is OH, wherein in embodiments R is O—R (alkoxy), for example, in embodiments, R is O—$CH_3$ (methoxy), wherein in embodiments R is OAc, wherein OAc refers to any acetate moiety, and wherein in embodiments R is a co-polymer of maleic anhydride.

DETAILED DESCRIPTION

The present disclosure is directed to compounds of the formulae

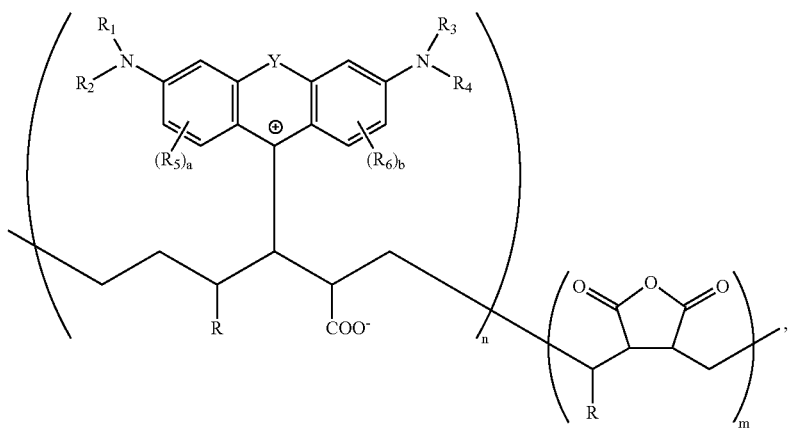

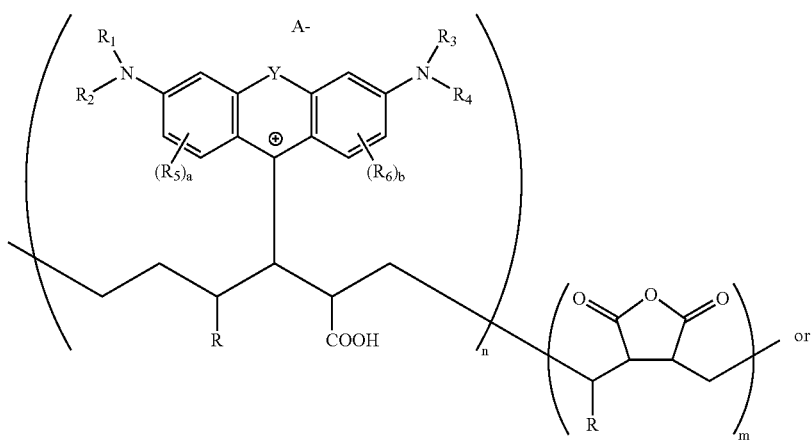

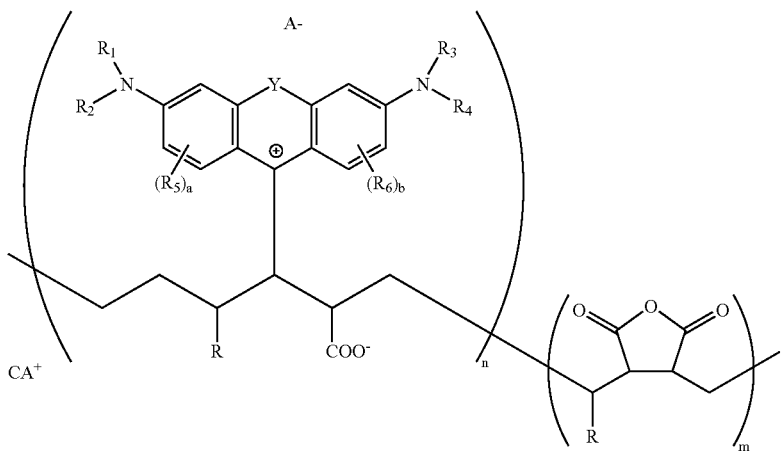

wherein $R_1$, $R_2$, $R_3$, and $R_4$ each, independently of the others, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, boron, phosphorus, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, wherein $R_1$ and $R_2$ can be joined together to form a ring, wherein $R_3$ and R can be joined together to form a ring, and wherein $R_1$, $R_2$, $R_3$, and $R_4$ can each be joined to a phenyl ring in the central structure, wherein in embodiments, at least one of $R_1$, $R_2$, $R_3$ and $R_4$ is an alkyl group, wherein in embodiments, at least one of $R_1$, $R_2$, $R_3$ and $R_4$ is an aryl group;

a and b each, independently of the others, is an integer which is 0, 1, 2, or 3, in embodiments, wherein a and b are each zero;

each $R_5$ and $R_6$, independently of the other, is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 50 carbon atoms, in another embodiment with no more than about 30 carbon atoms, and in yet another embodiment with no more than about 18 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as benzyl or the like, (iv) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as tolyl or the like, (v) a halogen atom, such as fluorine, chlorine, bromine, iodine, or the like, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, (xxxvi) a urea group, or (xxxvii) hydrogen, wherein $R_5$ and $R_6$ can each be joined to a phenyl ring in the central structure,

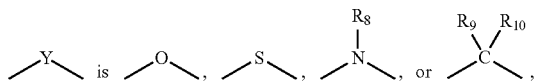

$R_8$, $R_9$, and $R_{10}$ each, independently of the others, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, wherein in embodiments, the number of carbon atoms in $R_1+R_2+R_3+R_4+R_5+R_6+R_8+R_9+R_{10}$ is in one embodiment at least about 4, in another embodiment at least about 16, in another embodiment at least about 18, in yet another embodiment at least about 20, in still another embodiment at least about 22, in another embodiment at least about 24, in yet another embodiment at least about 26, in still another embodiment at least about 28, in another embodiment at least about 30, in yet another embodiment at least about 32, in still another embodiment at least about 34, in another embodiment at least about 36, in yet another embodiment at least about 38, in still another embodiment at least about 40, in another embodiment at least about 42, in yet another embodiment at least about 44, in still another embodiment at least about 46, in another embodiment at least about 48, in yet another embodiment at least about 50, in still another embodiment at least about 52, in another embodiment at least about 54, in yet another embodiment at least about 56, in still another embodiment at least about 58, in another embodiment at least about 60, in yet another embodiment at least about 62, in still another embodiment at least about 64, in another embodiment at least about 66, in yet another embodiment at least about 68, in still another embodiment at least about 70, and in another embodiment at least about 72, wherein R is (i) an alkyl group, (ii) an aryl group, (iii) an arylalkyl group, or (iv) an alkylaryl group, wherein R if an alkyl group has in one embodiment from about 1 to about 100 carbon atoms, and in another embodiment from about 18 to about 33 carbon atoms, and in yet another embodiment about 30 carbon atoms, and in another embodiment about 50 carbon atoms, wherein R if an aryl group has in one embodiment from about 5 to about 20 carbon atoms, and in another embodiment about 6 carbon atoms, and in another embodiment about 10 carbon atoms, wherein R if an alkylaryl group has in one embodiment about 7 carbon atoms, and in another embodiment about 30 carbon atoms, and in yet another embodiment, about 50 carbon atoms, and in another embodiment about 100 carbon atoms, wherein R if an arylalkyl group has in one embodiment about 7 carbon atoms, and in another embodiment about 30 carbon atoms, and in another embodiment about 50 carbon atoms, and in another embodiment about 100 carbon atoms, wherein in embodiments, R is a waxy chain, waxy as used herein meaning containing at least about 10 carbon atoms, or at least about 18 carbon atoms, or from about 18 to about 100 carbon atoms, or from about 18 to about 33 carbon atoms, wherein in embodiments R is $C_6H_5$ (phenyl), wherein in embodiments R is $CH_2CH_2$ (ethylene), wherein in embodiments R is OH, wherein in embodiments R is O—R (alkoxy), for example, in embodiments, R is O—$CH_3$ (methoxy), wherein in embodiments R is OAc, wherein OAc refers to any acetate moiety, and wherein in embodiments R is a co-polymer of maleic anhydride;

wherein n is an integer which is about 1 to about 1000, or about 1 to about 20 or at least about 4, or at least about 12, or at least about 50, and where m is an integer which is about 1 to about 1000, or about 1 to about 20, or at least about 4, or at least about 12, or at least about 50;

wherein A is an anion, with examples of suitable anions including (but not being limited to) $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_3^-$, $NO_3^-$, $HCOO^-$, $CH_3COO^-$, $H_2PO_4^-$, $HPO_4^{2-}$, $SCN^-$, $BF_4^-$, $ClO_4^-$, $SSO_3^-$, $PF_6^-$, $SbCl_6^-$, or the like, as well as mixtures thereof, and wherein CA is either a hydrogen atom or a cation with examples of suitable cations including (but not being limited to) alkali metal cations, such as Li+, Na+, K+, Rb+, and Cs+, nonpolymeric or monomeric ammonium and quaternary amine cations, including those of the general formula

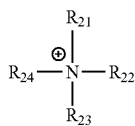

wherein each of $R_{21}$, $R_{22}$, $R_{23}$, and $R_{24}$, independently of the others, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, wherein one or more of $R_{21}$, $R_{22}$, $R_{23}$, and $R_{24}$ can be joined together to form a ring, and wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, oligomeric and polymeric cations, such as cationic polymers or oligomers, and the like, as well as mixtures thereof.

In one embodiment, the number of carbon atoms in $R_1+R_2+R_3+R_4$ is at least about 4, in another embodiment at least about 16, in another embodiment at least about 18, in yet another embodiment at least about 20, in still another embodiment at least about 22, in another embodiment at least about 24, in yet another embodiment at least about 26, in still another embodiment at least about 28, in another embodiment at least about 30, in yet another embodiment at least about 32, in still another embodiment at least about 34, in another embodiment at least about 36, in yet another embodiment at least about 38, in still another embodiment at least about 40, in another embodiment at least about 42, in yet another embodiment at least about 44, in still another embodiment at least about 46, in another embodiment at least about 48, in yet another embodiment at least about 50, in still another embodiment at least about 52, in another embodiment at least about 54, in yet another embodiment at least about 56, in still another embodiment at least about 58, in another embodiment at least about 60, in yet another embodiment at least about 62, in still another embodiment at least about 64, in another embodiment at least about 66, in yet another embodiment at least about 68, in still another embodiment at least about 70, and in another embodiment at least about 72.

In some specific embodiments wherein

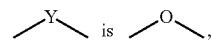

in one embodiment, the number of carbon atoms in $R_1+R_2+R_3+R_4$ is at least about 44, in still another embodiment at least about 46, in another embodiment at least about 48, in yet another embodiment at least about 50, in still another embodiment at least about 52, in another embodiment at least about 54, in yet another embodiment at least about 56, in still another embodiment at least about 58, in another embodiment at least about 60, in yet another embodiment at least about 62, in still another embodiment at least about 64, in another embodiment at least about 66, in yet another embodiment at least about 68, in still another embodiment at least about 70, and in another embodiment at least about 72.

In some specific embodiments wherein

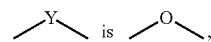

at least one of $R_1$, $R_2$, $R_3$, and $R_4$ is a group of the formula

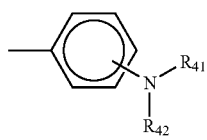

wherein $R_{41}$ and $R_{42}$ each, independently of the other, is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in another embodiment with at least about 2 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (iv) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, wherein one or more of $R_{41}$ and $R_{42}$ can be joined together to form a ring, and wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, oligomeric and polymeric cations, such as cationic polymers or oligomers, and the like, as well as mixtures thereof.

In some specific embodiments wherein

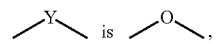

at least one of $R_1$, $R_2$, $R_3$, and $R_4$ is a branched alkyl group having in one embodiment at least about 19 carbon atoms, and in another embodiment at least about 20 carbon atoms.

Since hetero atoms can be included in the alkyl, aryl, arylalkyl, and alkylaryl groups, and since the groups can be substituted, it is to be understood that $R_1$, $R_2$, $R_3$, $R_4$, $R_5$, $R_6$, $R_8$, $R_9$, and $R_{10}$ can also be groups such as alkoxy, polyalkyleneoxy, aryloxy, polyaryleneoxy, arylalkyloxy, polyarylalkyleneoxy, alkylaryloxy, or polyalkylaryleneoxy groups, provided that the oxygen atom in such a group is not directly bonded to a nitrogen, oxygen, or sulfur atom in the

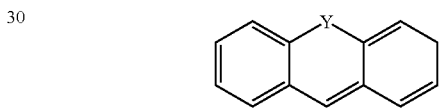

central structure.

Examples of situations wherein one of the R1-4 groups is a cycloalkyl is when

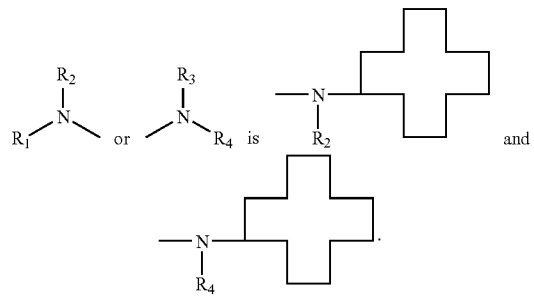

Examples of situations wherein the R1-4 groups are joined together to form a ring are when

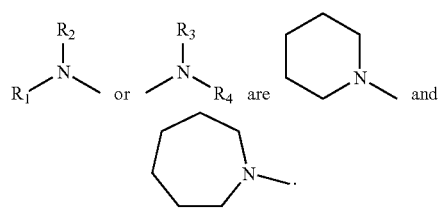

Examples of situations wherein one of the R1-4 groups is joined to a phenyl ring in the central structure is when
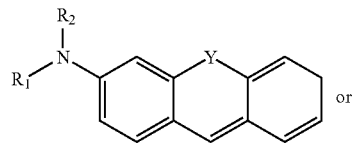
or
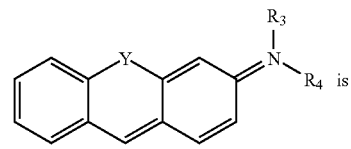
is
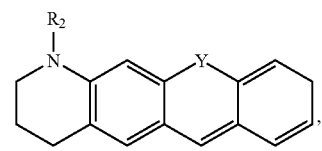
,
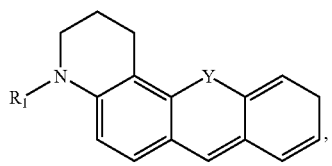
,
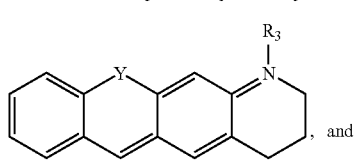
, and
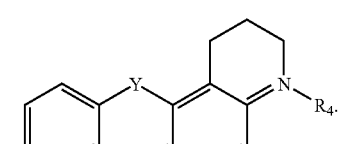
.
Compounds according to the present disclosure include rhodamines, wherein
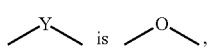 is 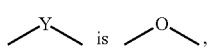,
of the general formula
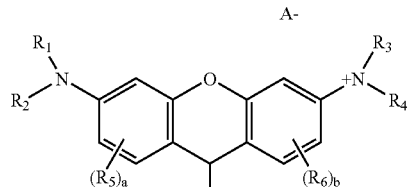
or
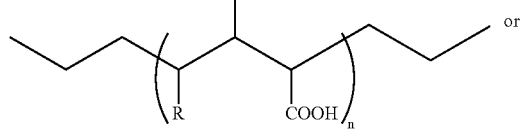
acridines, wherein
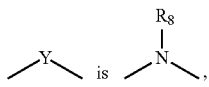 is 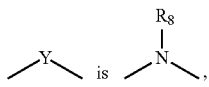,
of the general formula
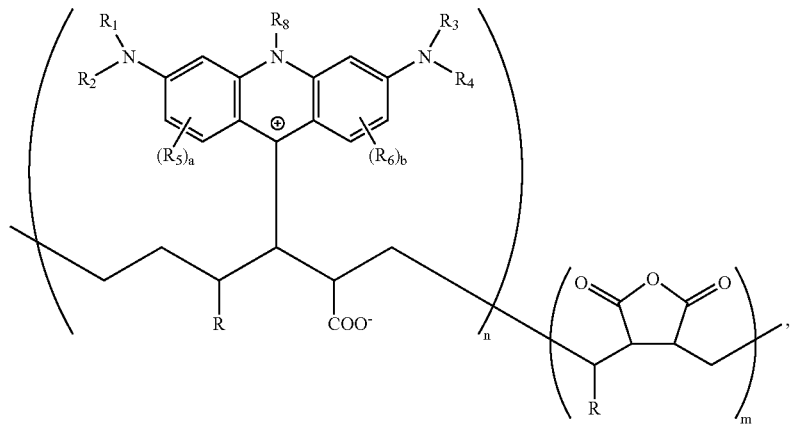

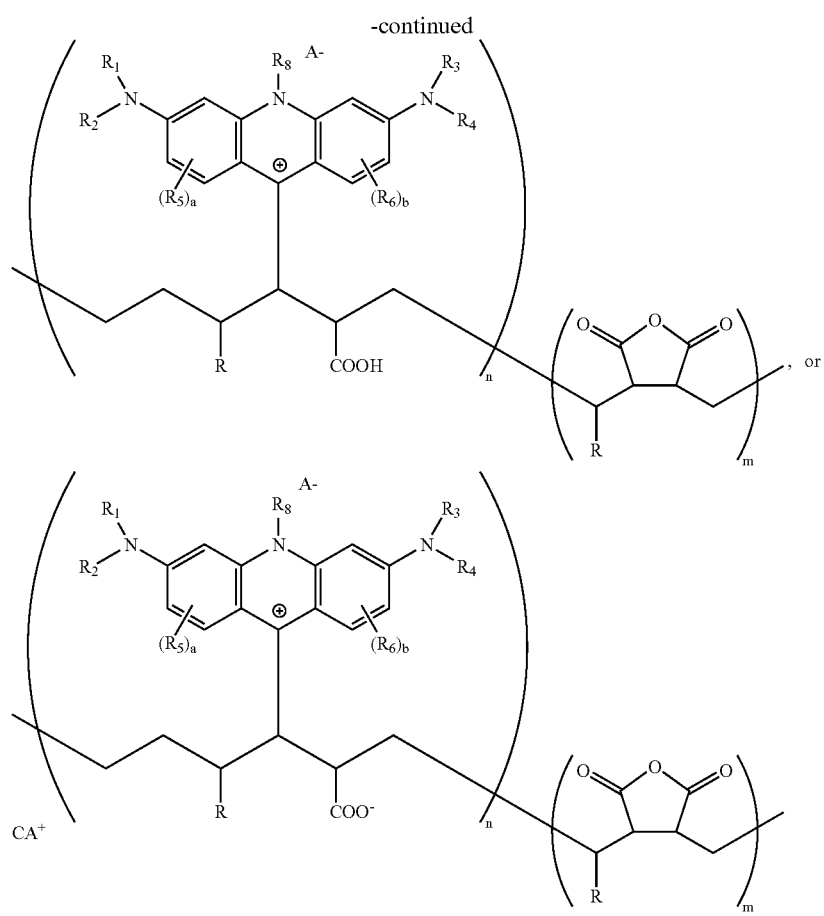
sulforhodamines, wherein
$-Y-$ is $-S-$,
of the general formula
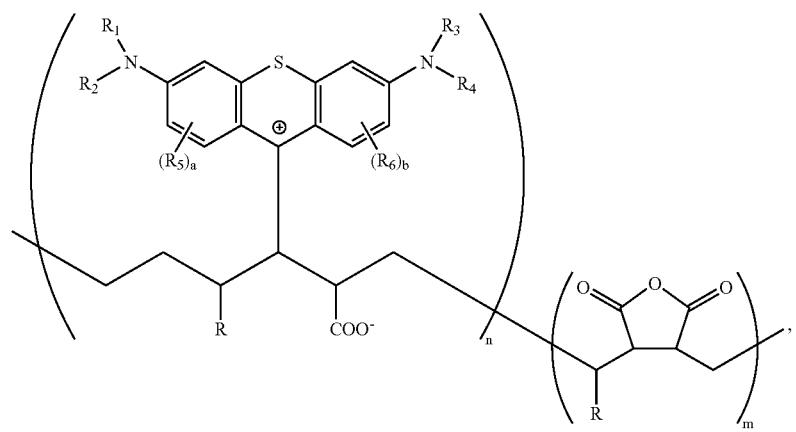

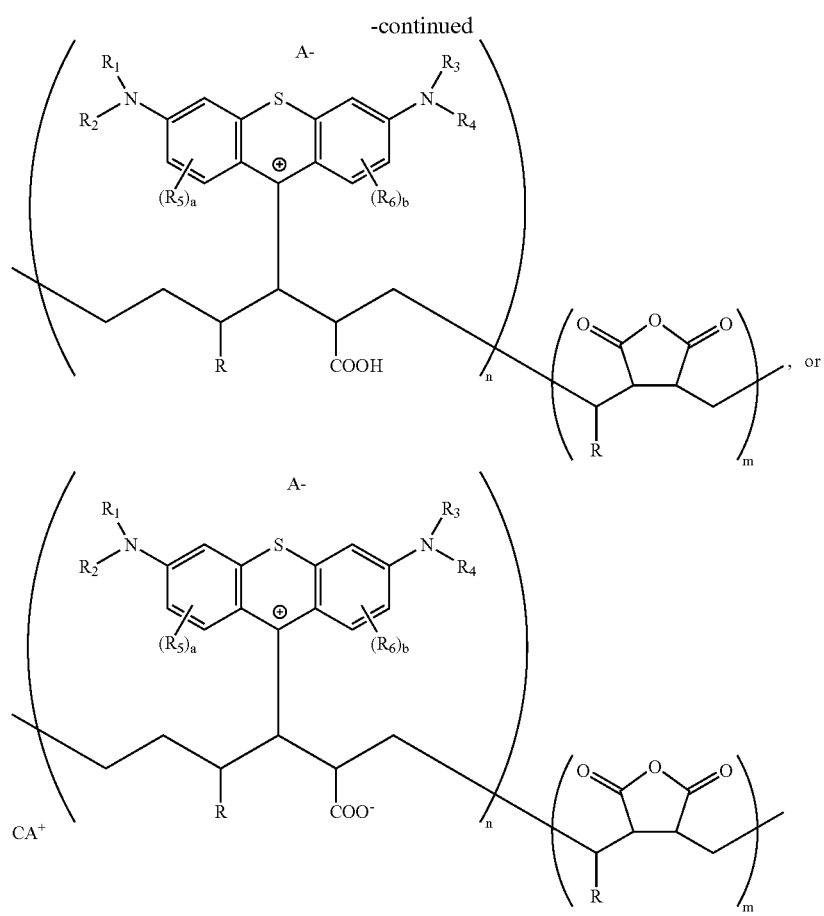
, or
anthracenes, wherein
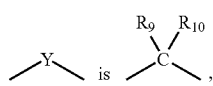
of the general formula
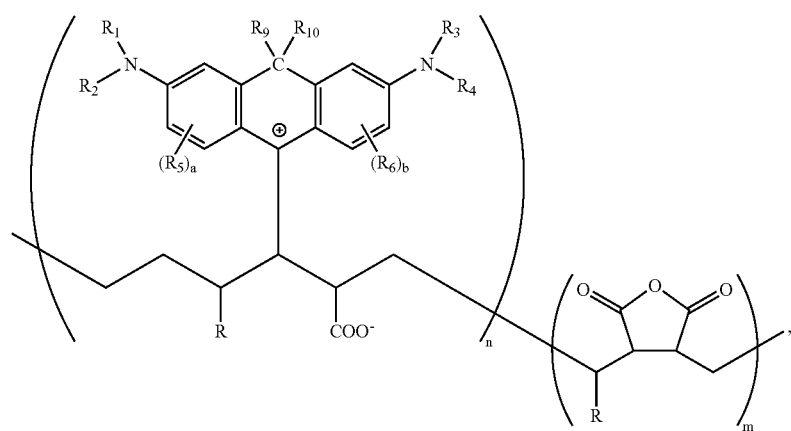
,

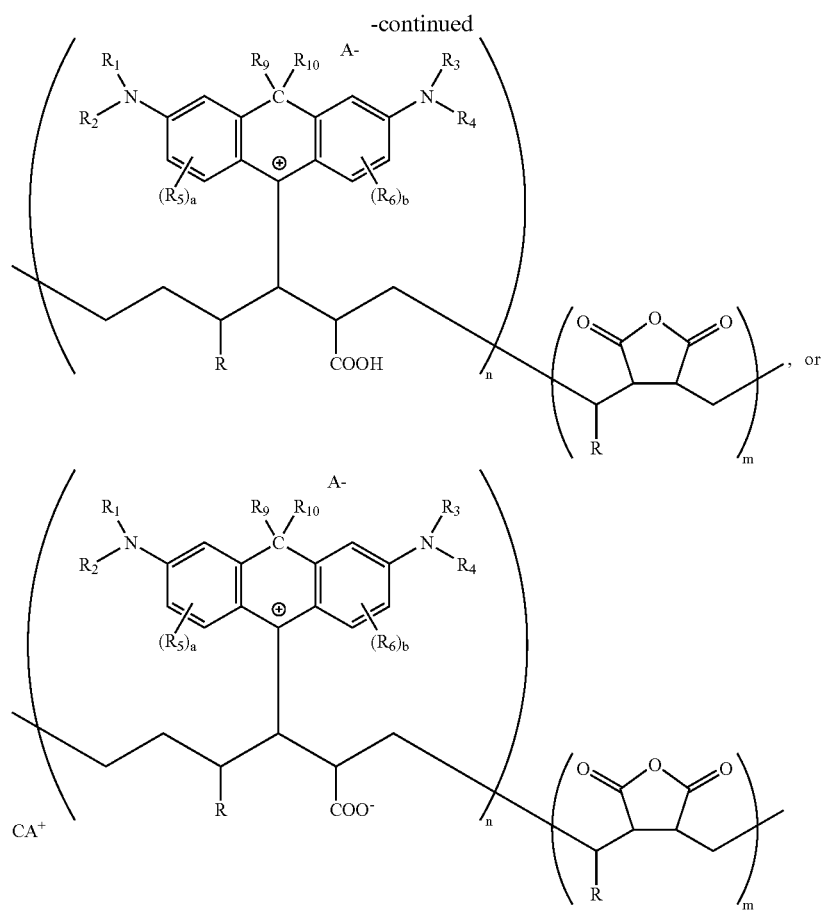

and the like.

In a specific embodiment, the anion A can be an organic dianion of the formula A1-R11-A2 wherein A1 and A2 each, independently of the other, are anionic groups, such as carboxylate, sulfonate, or the like, and wherein R11 is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, and wherein the substituents on the substituted alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Examples of suitable organic dianions include unsubstituted and substituted naphthalene disulfonates, unsubstituted and substituted benzene disulfonates, and the like, as well as mixtures thereof.

In another specific embodiment, the anion A can be an organic trianion, tetraanion, and higher, an oligomeric and polymeric anion, such as a polysulfonate or polycarboxylate, or the like.

In one specific embodiment, the colorants according to the present disclosure are of the formula

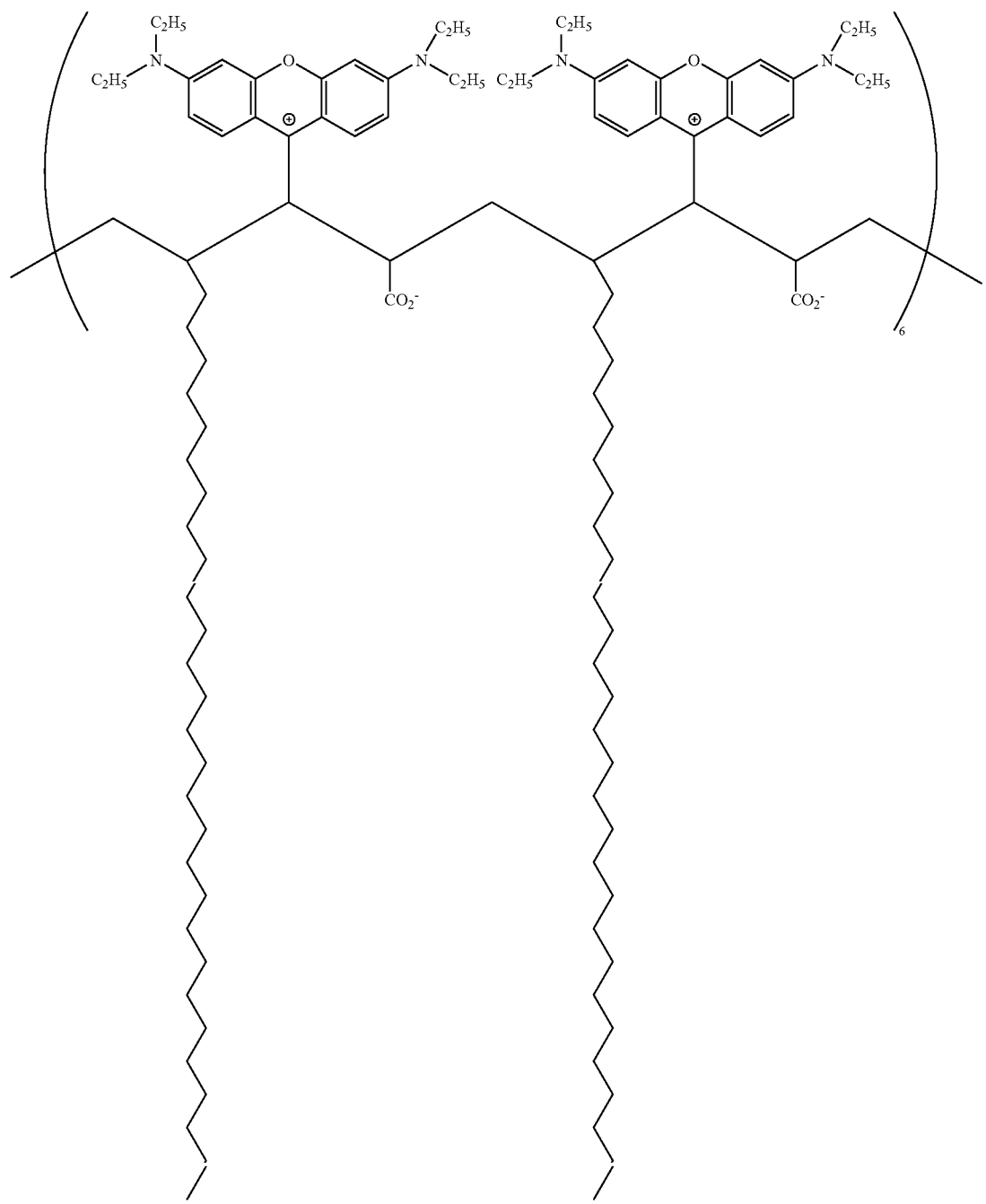

In another specific embodiment, the colorants according to the present disclosure are of the formula
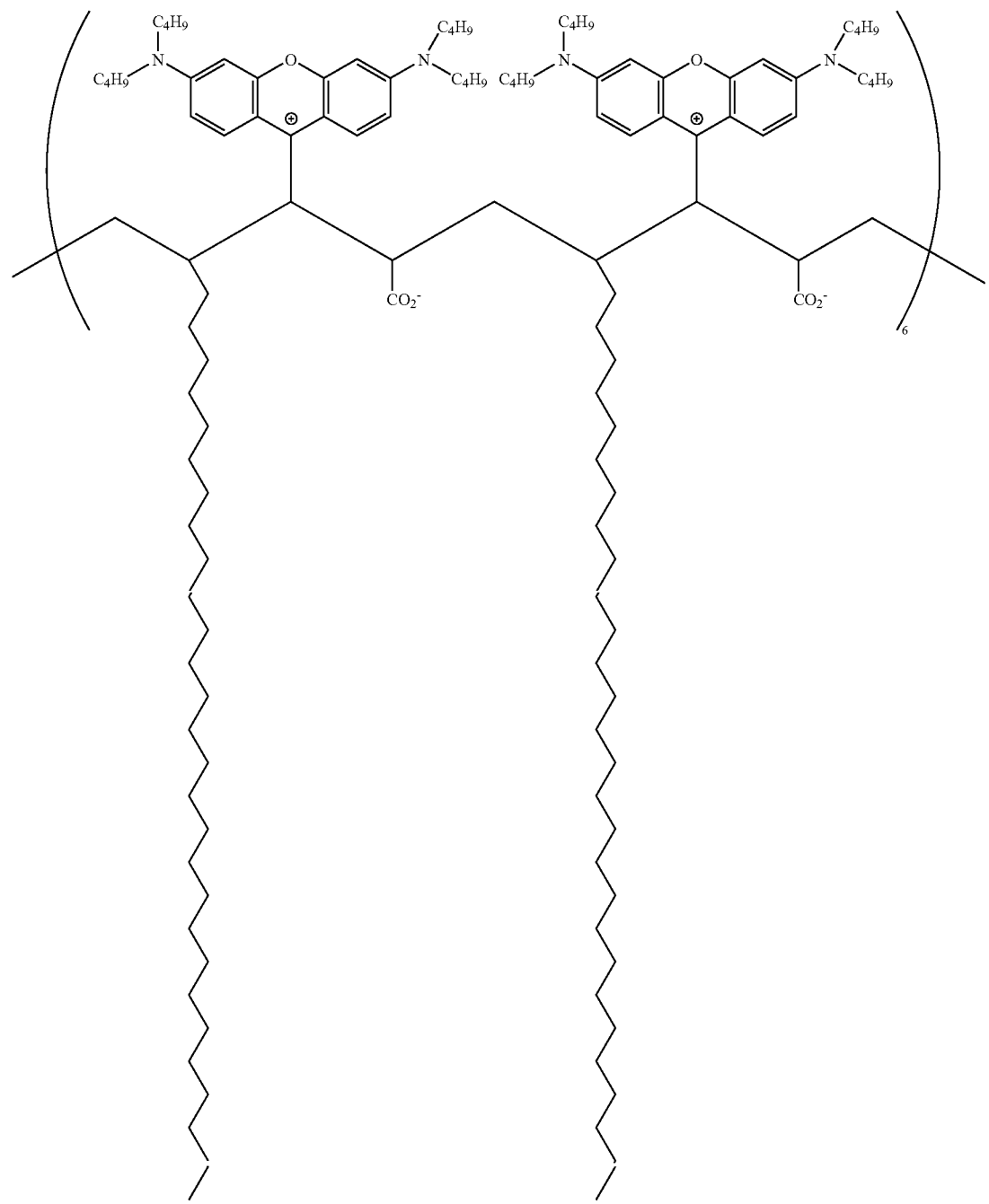

It is to be understood that in colorants of the formula
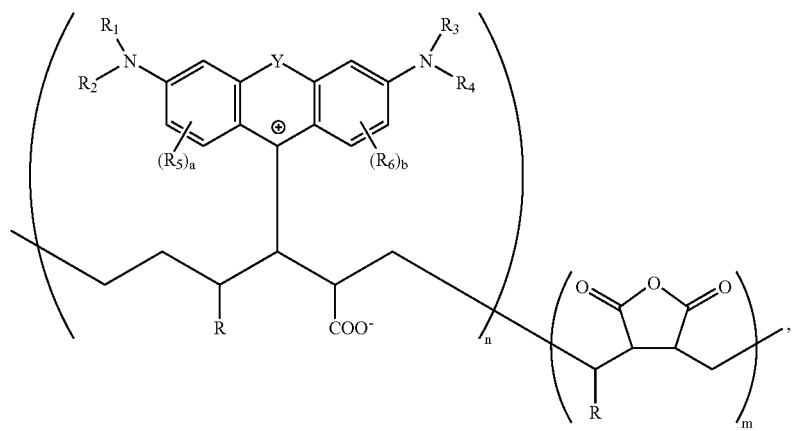
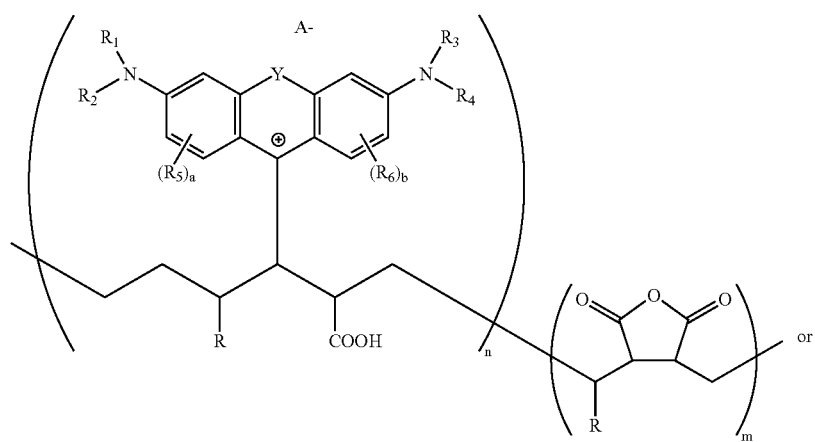
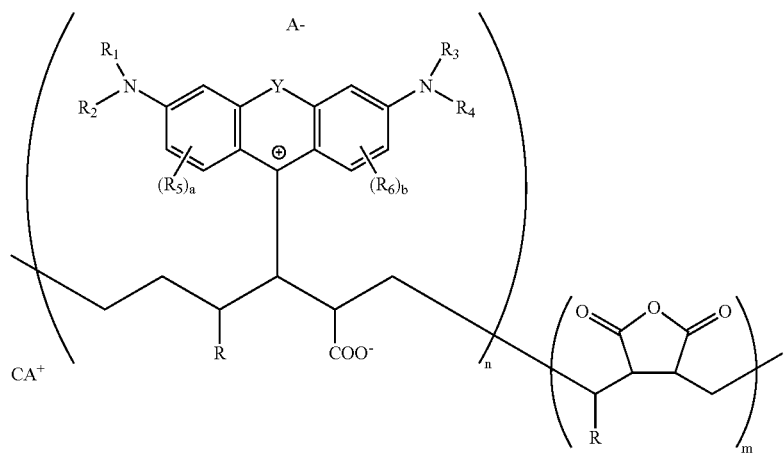

the positive charge is delocalized, and that other tautomeric structures can be drawn, including (but not limited to)

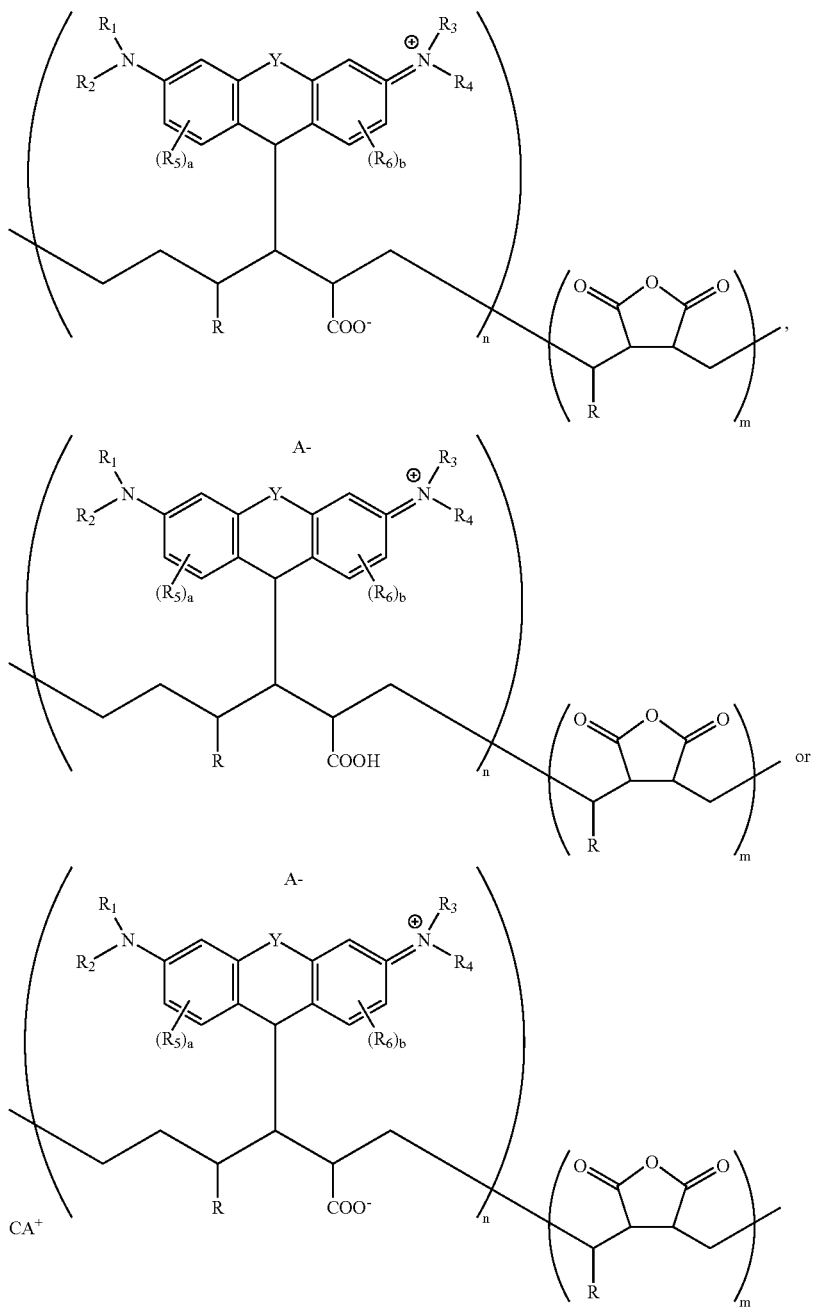

and the like. It is to be understood that all possible tautomeric forms of these colorants are included within the above formulae.

Colorants of the present disclosure can be prepared by any desired or effective procedure. For example, an α-olefin-maleic anhydride copolymer (for example, X5400, a 7000 MW copolymer available from the Baker Petrolite Corp.) having the desired R groups (which R groups will form the polymer backbone of the present colorant and can be selected from the R groups of the of the present colorant as defined herein) can be admixed with one or more aminophenols (for example, N,N-diethylaminophenol, MW=165, available from Aldrich Chemical Corp.) having the desired $R_1$, $R_2$, $R_3$, and $R_4$ groups, etc., thereon, with the $R_1$, $R_2$, $R_3$, and $R_4$ groups, etc., selected as defined for the colorant herein, heated, either neat or, optionally, in the presence of a solvent, after which an acid is added, for example conc. $H_2SO_4$ with additional heating.

The α-olefin-maleic anhydride copolymer and the aminophenol are present in any desired or effective relative amounts, in one embodiment at least about 0.5 mole of α-olefin-maleic anhydride copolymer per every 2 moles of aminophenol, in another embodiment at least about 0.8 mole of α-olefin-maleic anhydride copolymer per every 2 moles of aminophenol, and in yet another embodiment at least about 1 mole of α-olefin-maleic anhydride copolymer per every 2 moles of aminophenol, and in one embodiment no more than about 1.5 moles of α-olefin-maleic anhydride copolymer per every 2 moles of aminophenol, in another embodiment no more than about 2 moles of α-olefin-maleic anhydride copolymer per every 2 moles of aminophenol, and in yet another embodiment no more than about 6 moles of α-olefin-maleic anhydride copolymer per every 2 moles of aminophenol, although the relative amounts can be outside of these ranges.

If desired, the reaction can be run neat, in the absence of a solvent. In addition, if desired, the reaction can be run in the presence of an optional solvent. Examples of suitable solvents include tetramethylene sulfone (sulfolane), N-methyl pyrrolidone, dimethyl formamide, dimethyl sulfoxide, octanol, or the like, as well as mixtures thereof. When present, the optional solvent is present in any desired or effective amount, in one embodiment at least about 1 liter per every 0.1 mole of α-olefin-maleic anhydride copolymer, in another embodiment at least about 1 liter per every 0.3 mole of α-olefin-maleic anhydride copolymer, and in yet another embodiment at least about 1 liter per every 0.35 mole of α-olefin-maleic anhydride copolymer, and in one embodiment no more than about 1 liter per every 2 moles of α-olefin-maleic anhydride copolymer, in another embodiment no more than about 1 liter per every 1.5 moles of α-olefin-maleic anhydride copolymer, and in yet another embodiment no more than about 1 liter per every 1 mole of α-olefin-maleic anhydride copolymer, although the relative amounts can be outside of these ranges.

The mixture of α-olefin-maleic anhydride copolymer, aminophenol, and optional solvent is then heated to any effective temperature, in one embodiment at least about 62° C., in another embodiment at least about 150° C., and in yet another embodiment at least about 190° C., and in one embodiment no more than about 280° C., in another embodiment no more than about 220° C., and in yet another embodiment no more than about 200° C., although the temperature can be outside of these ranges.

The mixture of α-olefin-maleic anhydride copolymer, aminophenol, and optional solvent is heated for any effective period of time, in one embodiment at least about 5 minutes, in another embodiment at least about 2 hours, and in yet another embodiment at least about 3 hours, and in one embodiment no more than about 4 days, in another embodiment no more than about 60 hours, and in yet another embodiment no more than about 40 hours, although the time can be outside of these ranges.

In embodiments, acid can be added for example in an amount of about 1 mole of acid for each 2 moles of aminophenol. The acid is then added and the mixture heated for any to any effective temperature, in one embodiment at least about 62° C., in another embodiment at least about 150° C., and in yet another embodiment at least about 190° C., and in one embodiment no more than about 280° C., in another embodiment no more than about 220° C., and in yet another embodiment no more than about 200° C., although the temperature can be outside of these ranges.

The mixture of α-olefin-maleic anhydride copolymer, aminophenol, optional solvent, and acid is heated for any effective period of time, in one embodiment at least about 5 minutes, in another embodiment at least about 1 hour, in another embodiment at least about 2 hours, and in yet another embodiment at least about 3 hours, and in another embodiment about 14 hours, although the time can be outside of these ranges.

If desired, the resulting product can be purified by pouring the reaction mixture into an organic non-water-soluble and non-water-miscible solvent in which the product is soluble or miscible and in which undesirable salt byproducts are not soluble, such as methyl isobutyl ketone, toluene, hexane, heptane, or the like, followed by admixing the solvent containing the product with water in a separatory funnel and separating the aqueous and organic phases.

The crude product can then, if desired, be further purified by washing it with aqueous EDTA to remove metal salts, followed by washing with water. If desired, a titration or other instrumental technique, such as AA (atomic absorption) or ICP (inductively coupled plasma) can be performed to determine if the metal salts have been completely removed. The purified product can be isolated by distilling off any solvents.

Various substituents can be placed on the rings of the colorants of the present disclosure by any desired or effective method, such as, for example, the methods disclosed in U.S. Pat. Nos. 5,847,162 and 1,991,482, the disclosures of each of which are totally incorporated herein by reference. See for example, U.S. patent application Ser. No. 10/607,382, published Jan. 20, 2005, and U.S. Pat. No. 6,860,931, the disclosures of each of which are hereby incorporated by reference herein in their entireties.

In embodiments, transformations can be effected to produce alternate products. For example, in embodiments, the following reaction

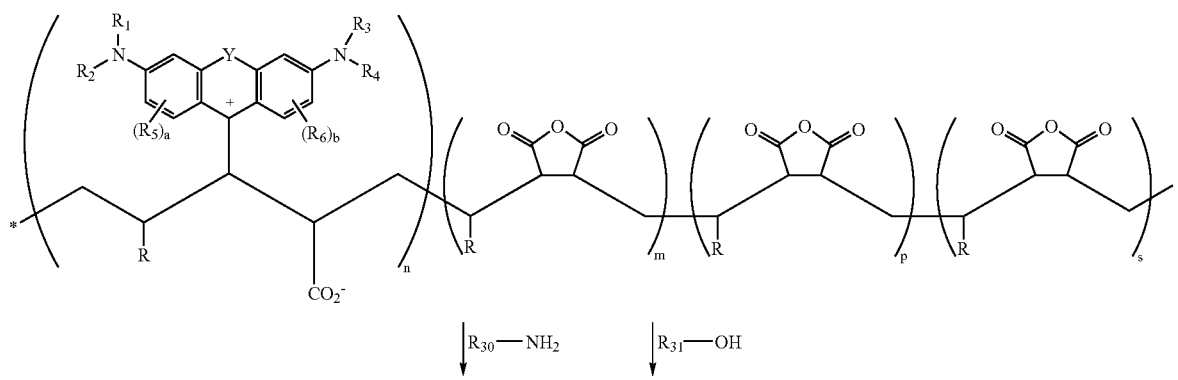

-continued

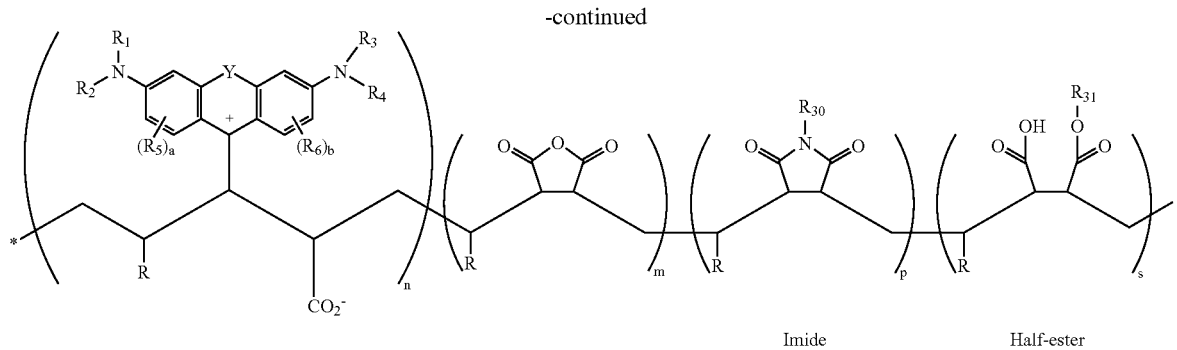

Imide    Half-ester wherein in embodiments $R_{30}$ and $R_{31}$ each, independently of the other, is an alkyl group, an aryl group, an alkylaryl group, or an arylalkyl group, wherein in embodiments $R_{30}$ and $R_{31}$ are each, independently of the other, selected from an alkyl group having from about 1 to about 100 carbon atoms, or about 18 to about 33 carbon atoms, or about 30 carbon atoms, or about 50 carbon atoms, an aryl group having from about 5 to about 20 carbon atoms, or about 6 carbon atoms, or about 10 carbon atoms, an alkylaryl group having about 7 carbon atoms or about 30 carbon atoms, or about 50 carbon atoms, or about 100 carbon atoms, or an arylalkyl group having from about 7 carbon atoms, or about 30 carbon atoms, or about 50 carbon atoms, or about 100 carbon atoms, wherein in embodiments R is a waxy chain, waxy as used herein meaning containing at least about 10 carbon atoms, or at least about 18 carbon atoms, or from about 18 to about 100 carbon atoms, or from about 18 to about 33 carbon atoms, wherein in embodiments R Is $C_6H_5$, (phenyl), wherein n is an integer which is about 1 to about 1000, or about 1 to about 20 or at least about 4, or at least about 12, or at least about 50, and where m is an integer which is about 1 to about 1000, or about 1 to about 20, or at least about 4, or at least about 12, or at least about 50; p is an integer which is about 1 to about 1000, or about 1 to about 20, or at least about 4, or at least about 12, or at least about 50, and s is an integer which is about 1 to about 1000, or about 1 to about 20 or at least about 4, or at least about 12, or at least about 50.

In another embodiment,

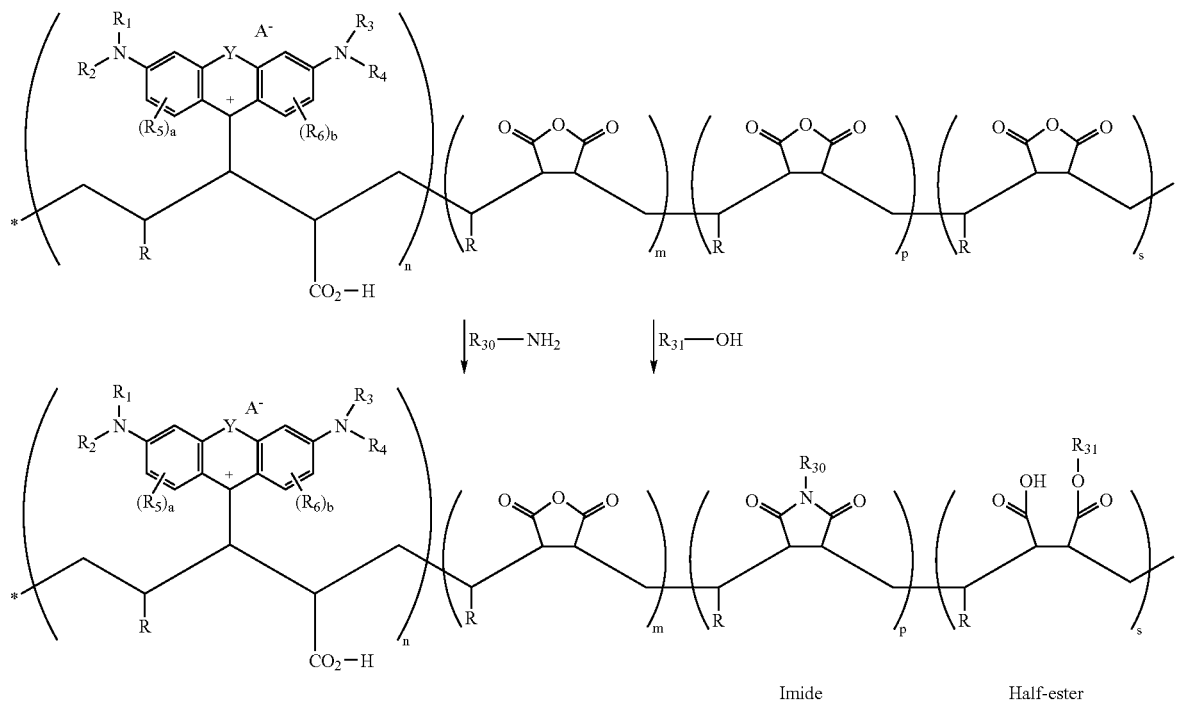

Imide    Half-ester wherein in embodiments $R_{30}$ and $R_{31}$ each, independently of the other, is an alkyl group, an aryl group, an alkylaryl group, or an arylalkyl group, wherein in embodiments $R_{30}$ and $R_{31}$ are each, independently of the other, selected from an alkyl group having from about 1 to about 100 carbon atoms, or about 18 to about 33 carbon atoms, or about 30 carbon atoms, or about 50 carbon atoms, an aryl group having from about 5 to about 20 carbon atoms, or about 6 carbon atoms, or about 10 carbon atoms, an alkylaryl group having about 7 carbon atoms or about 30 carbon atoms, or about 50 carbon atoms, or about 100 carbon atoms, or an arylalkyl group having from about 7 carbon atoms, or about 30 carbon atoms, or about 50 carbon atoms, or about 100 carbon atoms, wherein in embodiments R is a waxy chain, waxy as used herein meaning containing at least about 10 carbon atoms, or at least about 18 carbon atoms, or from about 18 to about 100 carbon atoms, or from about 18 to about 33 carbon atoms, wherein in embodiments R Is $C_6H_5$ (phenyl), wherein n is an integer which is about 1 to about 1000, or about 1 to about 20 or at least about 4, or at least about 12, or at least about 50, and where m is an integer which is about 1 to about 1000, or about 1 to about 20, or at least about 4, or at least about 12, or at least about 50; p is an integer which is about 1 to about 1000, or about 1 to about 20, or at least about 4, or at least about 12, or at least about 50, and s is an integer which is about 1 to about 1000, or about 1 to about 20 or at least about 4, or at least about 12, or at least about 50.

In yet another embodiment, wherein in embodiments R Is $C_6H_5$ (phenyl), wherein n is an integer which is about 1 to about 1000, or about 1 to about 20 or at least about 4, or at least about 12, or at least about 50, and where m is an integer which is about 1 to about 1000, or about 1 to about 20, or at least about 4, or at least about 12, or at least about 50; p is an integer which is about 1 to about 1000, or about 1 to about 20, or at least about 4, or at least about 12, or at least about 50, and s is an integer which is about 1 to about 1000, or about 1 to about 20 or at least about 4, or at least about 12, or at least about 50.

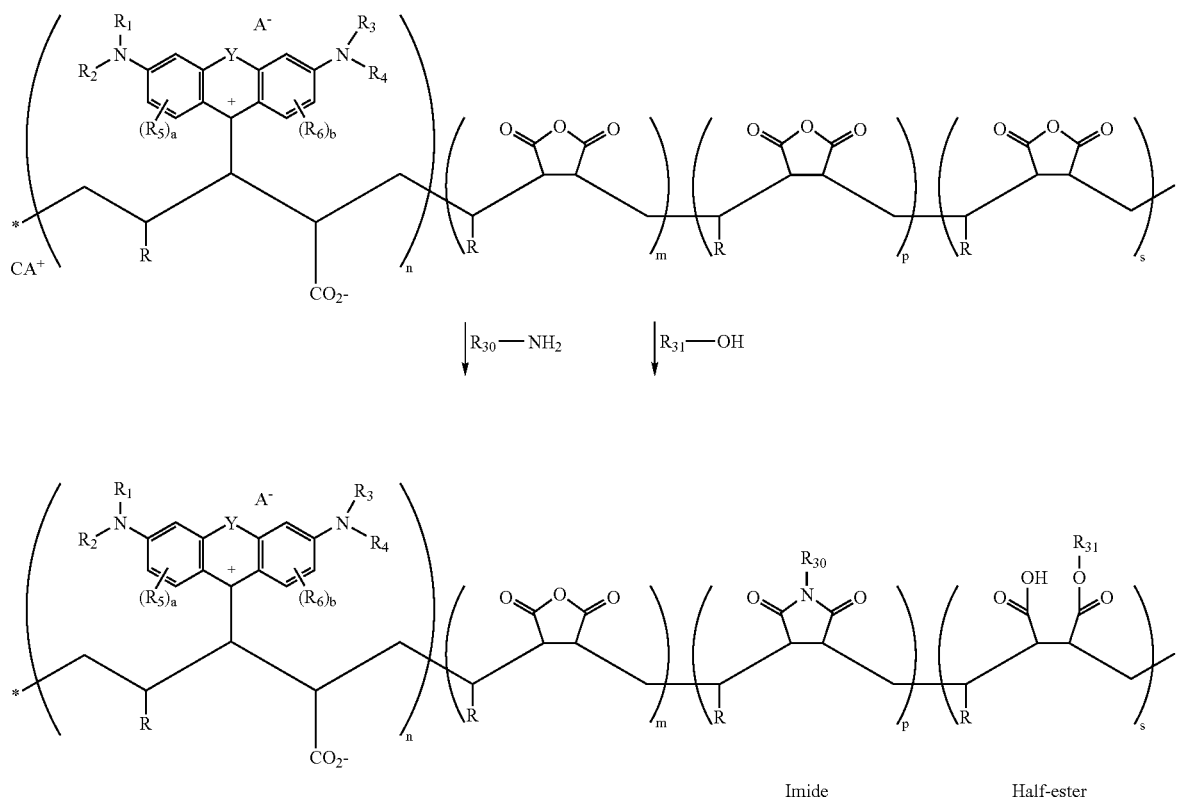

wherein in embodiments $R_{30}$ and $R_{31}$ each, independently of the other, is an alkyl group, an aryl group, an alkylaryl group, or an arylalkyl group, wherein in embodiments $R_{30}$ and $R_{31}$ are each, independently of the other, selected from an alkyl group having from about 1 to about 100 carbon atoms, or about 18 to about 33 carbon atoms, or about 30 carbon atoms, or about 50 carbon atoms, an aryl group having from about 5 to about 20 carbon atoms, or about 6 carbon atoms, or about 10 carbon atoms, an alkylaryl group having about 7 carbon atoms or about 30 carbon atoms, or about 50 carbon atoms, or about 100 carbon atoms, or an arylalkyl group having from about 7 carbon atoms, or about 30 carbon atoms, or about 50 carbon atoms, or about 100 carbon atoms, wherein in embodiments R is a waxy chain, waxy as used herein meaning containing at least about 10 carbon atoms, or at least about 18 carbon atoms, or from about 18 to about 100 carbon atoms, or from about 18 to about 33 carbon atoms,

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

An α-olefin-maleic anhydride copolymer (50 grams, X5400®, a 7000 MW copolymer obtained from Baker Petrolite Corporation) of the formula

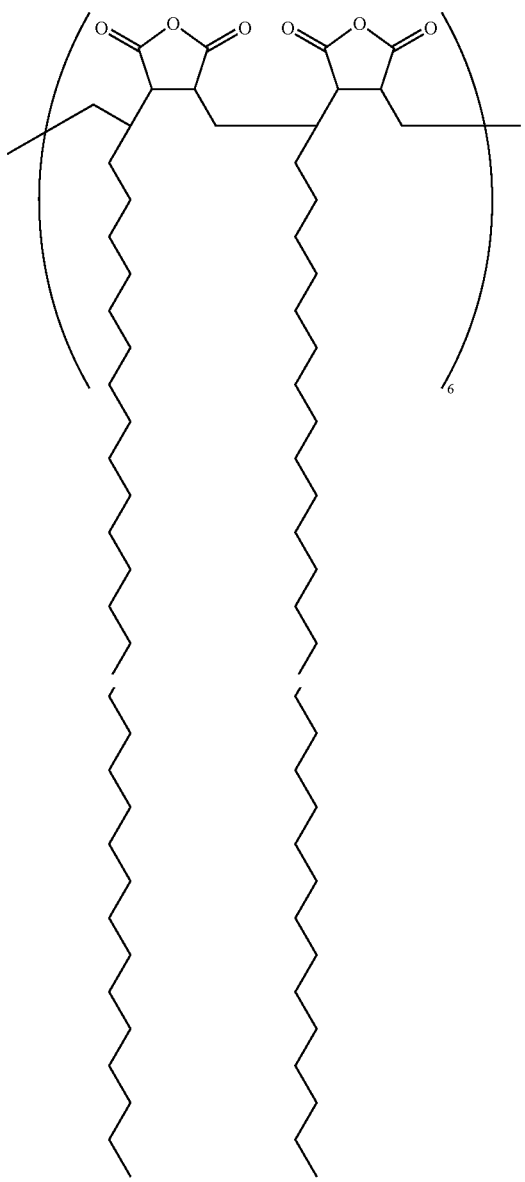

was placed in a 350 milliliter beaker with magnet and the beaker was placed in a 150° C. oil bath and allowed to melt at which time stirring was initiated. About 28.3 grams N,N-diethylaminophenol (a 75 MW aminophenol obtained from Aldrich Chemical Co.) of the formula

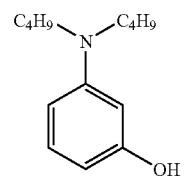

was then added and a watch glass placed over the beaker and the contents allowed to stir at 150° C. for 3 hours. About 2.5 grams of concentrated $H_2SO_4$ was then added and allowed to stir an additional 1 hour. The molten contents were then poured into a 1 liter beaker containing 500 milliliters of methanol. The solids were then transferred to a mortar and pestle and ground into a fine magenta powder. The powder was placed in a 500 milliliter beaker with 300 milliliters of methanol and heated and stirred to a boil. The beaker was removed from the heat and filtered through a Buchner funnel and the solid magenta polymer was collected. The Zwitterionic form of this colorant is believed to be of the formula

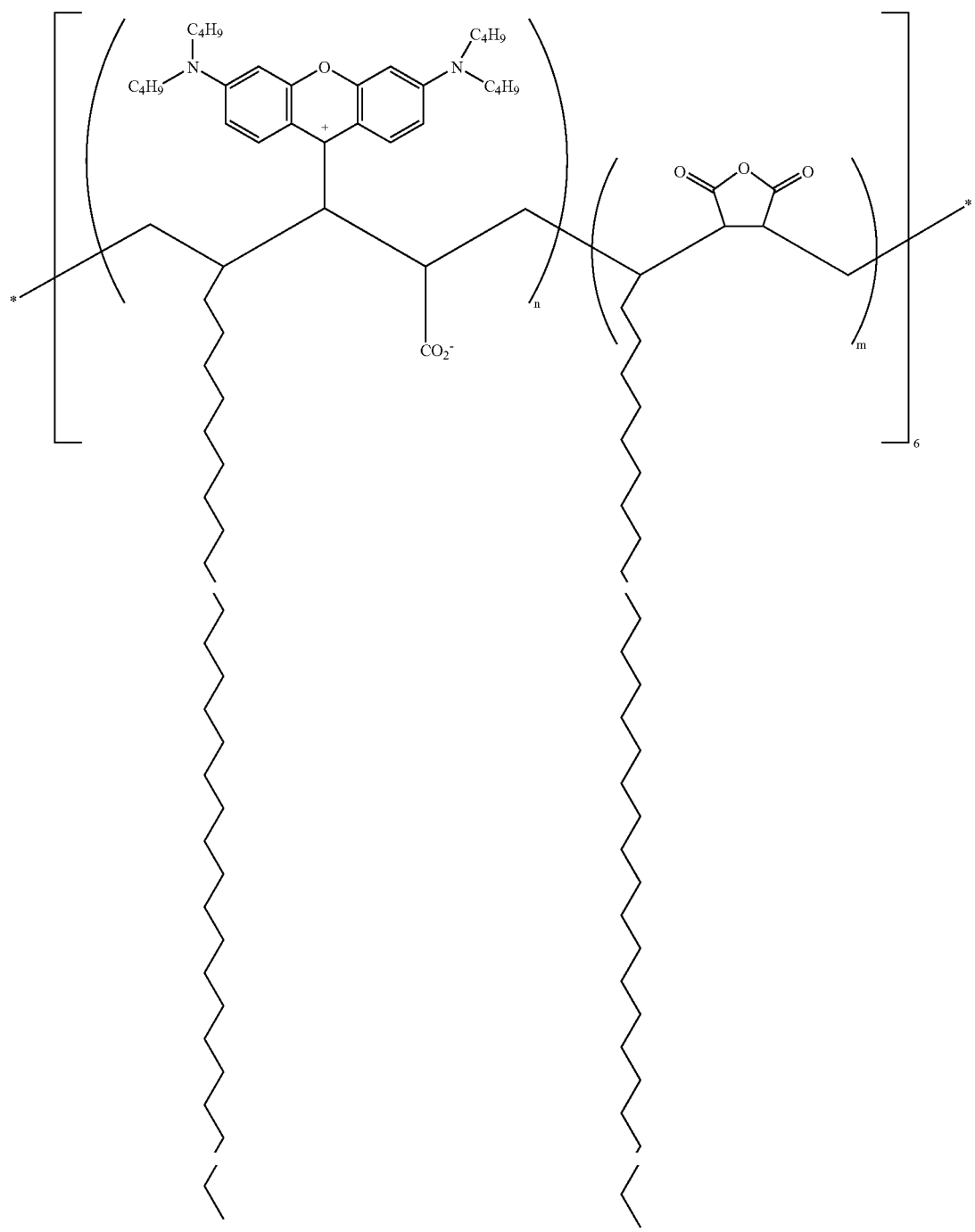
Other synthetic processes can also be used.
Example 2
Synthesis of Octadecenyl Succinic Anhydride Based Rhodamine
An α-olefin-maleic anhydride copolymer (50 grams, X5400®, a 7000 MW copolymer obtained from Baker Petromte Corporation) of the formula

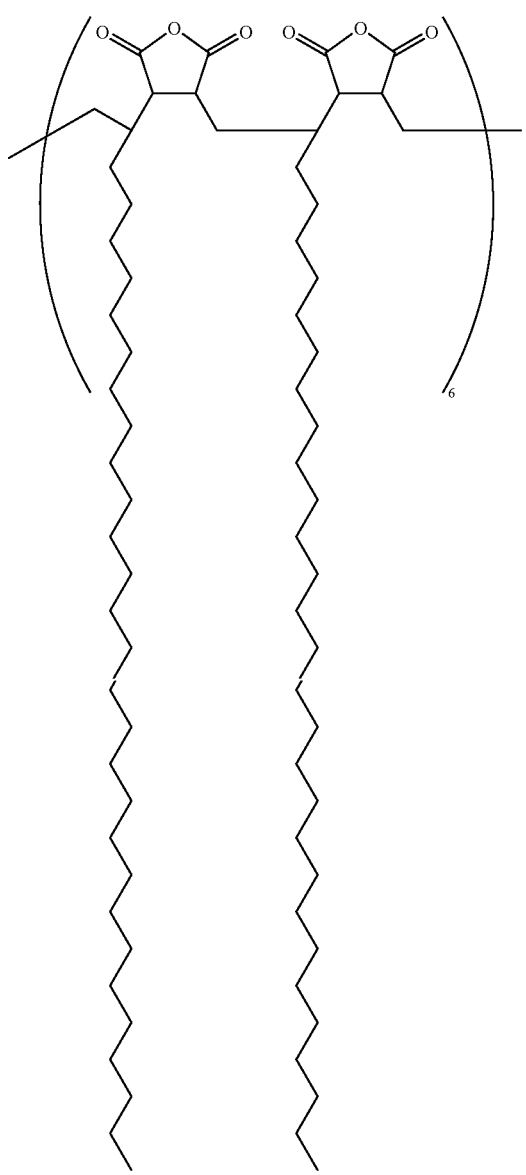

was placed in a 350 milliliter beaker with magnet and the beaker was placed in a 150° C. oil bath and allowed to melt at which time stirring was initiated. About 25.4 grams N,N-diethylphenol (a 221 MW aminophenol obtained from TCI America) of the formula

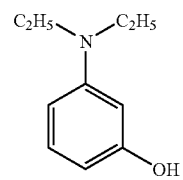

was then added and a watch glass placed over the beaker and the contents allowed to stir at 150° C. for 3 hours. About 5.6 grams of concentrated $H_2SO_4$ was then added and allowed to stir an additional 1 hour. The molten contents were then poured into a 1 liter beaker containing 500 milliliters of methanol. The solids were then transferred to a mortar and pestle and ground into a fine magenta powder. The powder was placed in a 500 milliliter beaker with 300 milliliters of methanol and heated and stirred to a boil. The beaker was removed from the heat and filtered through a Buchner funnel and the solid magenta polymer was collected. The Zwitterionic form of this colorant is believed to be of the formula

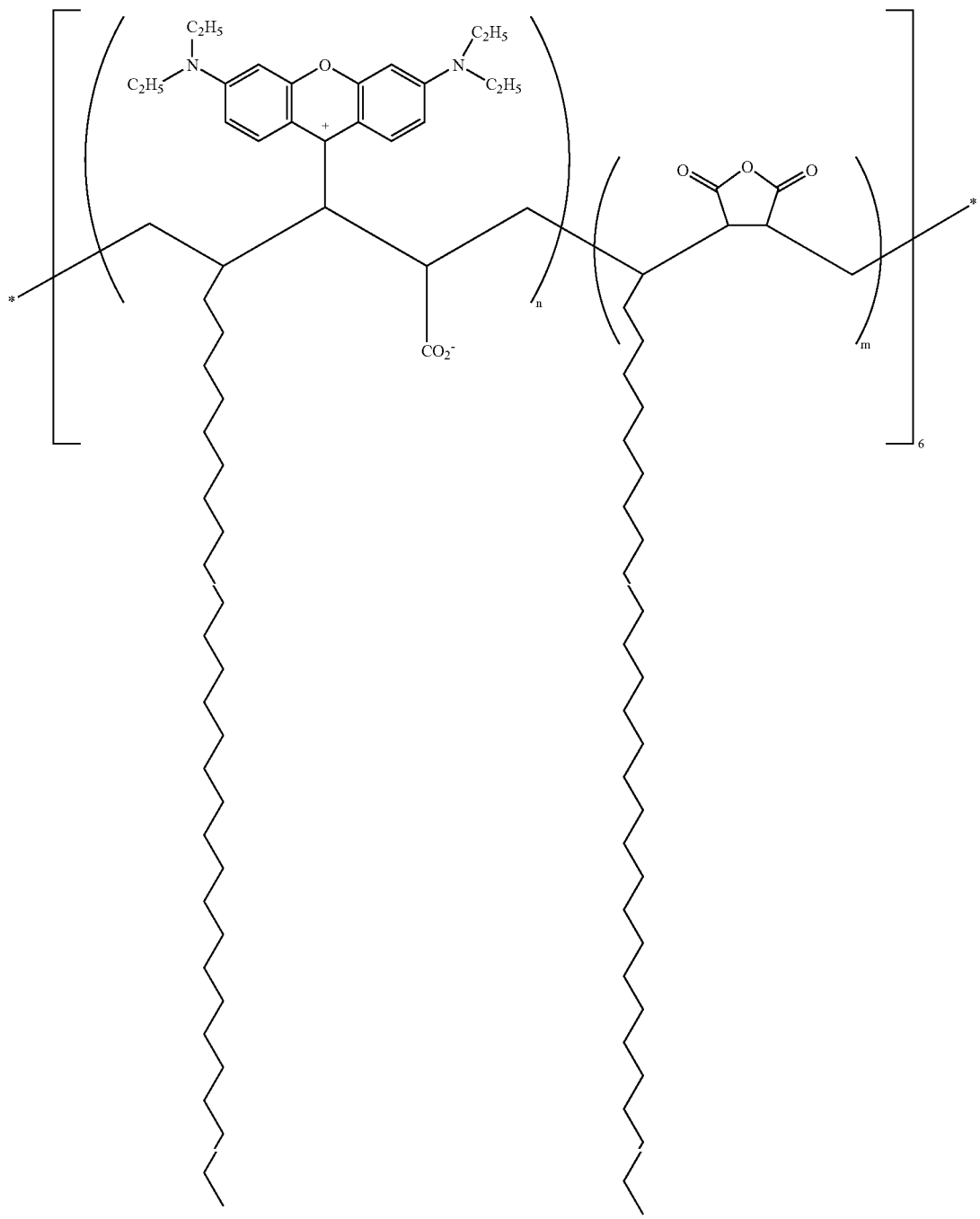

Example 3

Preparation of an Ink Base

An ink base was prepared by melting, admixing, and filtering the following ingredients:

43.59 parts by weight polyethylene wax (PE 655®, obtained from Baker Petrolite) of the formula $CH_3(CH_2)_{50}CH_3$;

19.08 parts by weight stearyl stearamide wax (KEMAMIDE® S-180, obtained from Crompton Corporation);

18.94 parts by weight tetra-amide resin obtained from the reaction of one equivalent of a C-36 dimer acid (obtained from Uniqema, New Castle, Del.) with two equivalents of ethylene diamine and UNICID® 700 (obtained from Baker Petrolite), a long chain hydrocarbon having a terminal carboxylic acid group, prepared as described in Example 1 of U.S. Pat. No. 6,174,937, which is hereby incorporated by reference herein in its entirety;

11.71 parts by weight urethane resin obtained from the reaction of two equivalents of ABITOL® E hydroabietyl alcohol (obtained from Hercules Inc.) and one equivalent of isophorone diisocyanate, prepared as described in Example 1 of U.S. Pat. No. 5,782,966, which is hereby incorporated by reference herein;

6.48 parts by weight urethane resin that is the adduct of three equivalents of stearyl isocyanate and a glycerol-based alcohol, prepared as described in Example 4 of U.S. Pat. No. 6,309,453, which is hereby incorporated by reference herein in its entirety;

0.20 parts by weight NAUGUARD® 445 antioxidant (obtained from Uniroyal Chemical Co.).

Thereafter, 600 grams of the ink carrier components as listed above in the percentages as listed above were added to a 1 liter beaker and heated in an oven at 135° C. until molten. Subsequently, the beaker was inserted into a heating mantle set to 135° C. and the contents of the beaker were stirred for 45 minutes. The resulting ink was then filtered through a combination of Whatman #3 and 0.2 micron NAE filters and placed in a Mott filter assembly. Filtration was supported by the addition of 1 percent by weight FILTER-AID obtained from Fluka Chemika, and proceeded at a temperature of 135 C until complete after 6 hours. The ink base was poured into molds containing about 31 grams of the colorless ink base and allowed to cool.

Example 4

Preparation of Ink Containing Colorant

About 30.0 grams of ink base from Example 3 was placed in a 100 milliliter beaker with a magnetic stir bar and subsequently placed in a 135 C oil bath until molten. About 2.0 grams of the product of Example 1 was then added and stirred for about 3 hours. The magenta colorant was then poured into an aluminum mold.

Example 5

Preparation of Ink Containing Colorant

About 30.0 grams of ink base from Example 3 was placed in a 100 milliliter beaker with a magnetic stir bar and subsequently placed in a 135 C oil bath until molten. About 2.0 grams of the product of Example 2 was then added and stirred for about 3 hours. The magenta colorant was then poured into an aluminum mold.

Example 6

Printing of Ink Samples Containing Colorant

Printed samples of the inks prepared in Examples 4 and 5 were generated on HAMMERMILL LASERPRINT® paper using a K Printing Proofer (manufactured by RK Print Coat Instrument Ltd., Litlington, Royston, Heris, SG8 0OZ, U.K.). In this method, the tested inks were melted onto a printing plate set at 150° C. temperature. A roller bar fitted with the paper was then rolled over the plate containing the melted ink on its surface. The ink on the paper was cooled, resulting in three separated images of rectangular blocks. The most intensely colored block contained the most ink deposited on the paper, and was therefore used to obtain the color value measurements. The printed samples were evaluated visually.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A compound of the formula

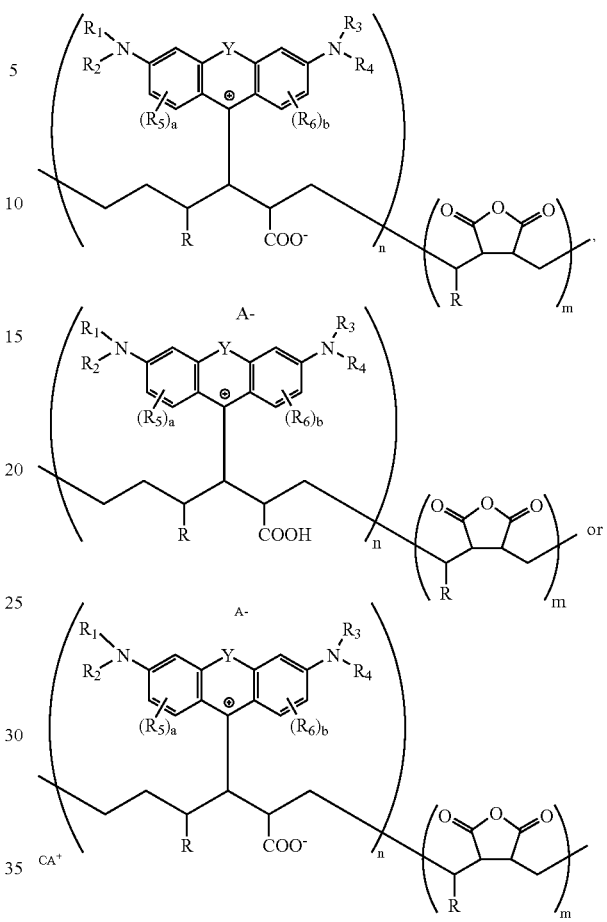

wherein $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure;

wherein a and b each, independently of the others, is an integer which is 0, 1, 2, or 3, wherein $R_5$ and $R_6$ are hydrogen or alkyl;

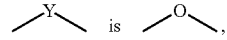

wherein A is an anion selected from the group consisting of $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_3^-$, $NO_3^-$, $HCOO^-$, $CH_3COO^-$, $H_2PO_4^-$, $HPO_4^{2-}$, $SCN^-$, $BF_4^-$, $ClO_4^-$, $SSO_3^-$, $PF_6^-$, and $SbCl_6^-$;

wherein CA is either a hydrogen atom an alkali metal cation, or a quaternary amine cation of the formula

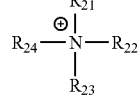

wherein each of $R_{21}$, $R_{22}$, $R_{23}$, and $R_{24}$ are independently selected from an alkyl group having 1 to 6 carbon atoms;

wherein R is (i) an alkyl group, (ii) an aryl group, (iii) an arylalkyl group, (iv) an alkylaryl group, (v) an alkoxy group, (vi) an acetate group, or (vii) a co-polymer of maleic anhydride;

wherein n is an integer which is 1 to 1,000; and
wherein m is an integer which is 1 to 1,000.

2. A compound according to claim 1, wherein a and b are each zero.

3. A compound according to claim 1, wherein at least one of $R_1$, $R_2$, $R_3$, and $R_4$ is an alkyl group.

4. A compound according to claim 1, wherein $R_1$ and $R_2$ are joined together to form a ring.

5. A compound according to claim 1, wherein $R_1$ and $R_2$ are joined together to form a ring and wherein $R_3$ and $R_4$ are joined together to form a ring.

6. A compound according to claim 1, wherein at least one of $R_1$, $R_2$, $R_3$, and $R_4$ is joined to a phenyl ring in the central structure.

7. A compound according to claim 1, wherein R is an alkyl group.

8. A compound according to claim 1, wherein R is an aryl group.

9. A compound according to claim 1, wherein R is $C_6H_5$.

10. A compound according to claim 1, wherein R is $CH_2CH_2$.

11. A compound of the formula

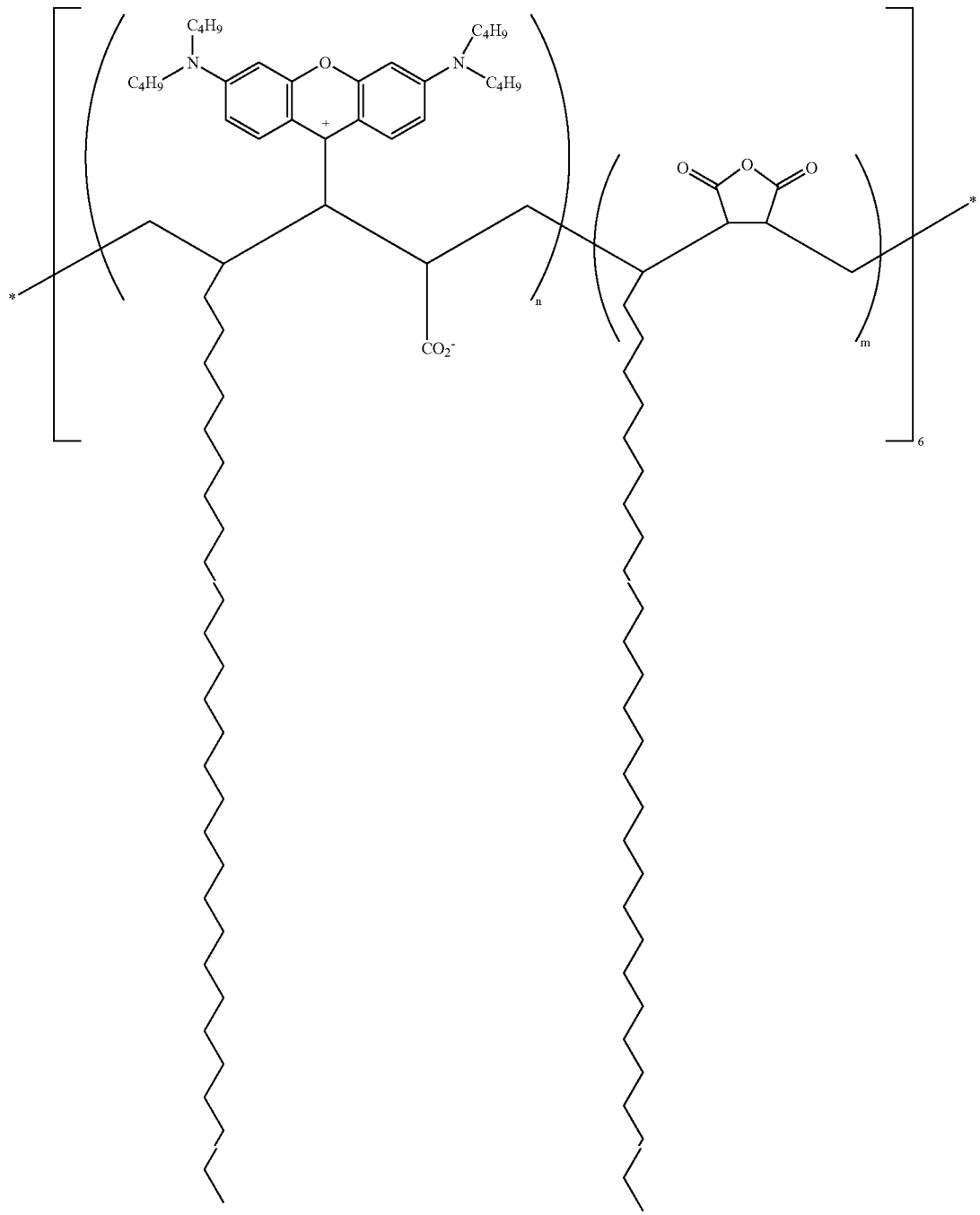

wherein n is 1 to 1,000 and wherein m is 1 to 1,000.

12. A compound of the formula
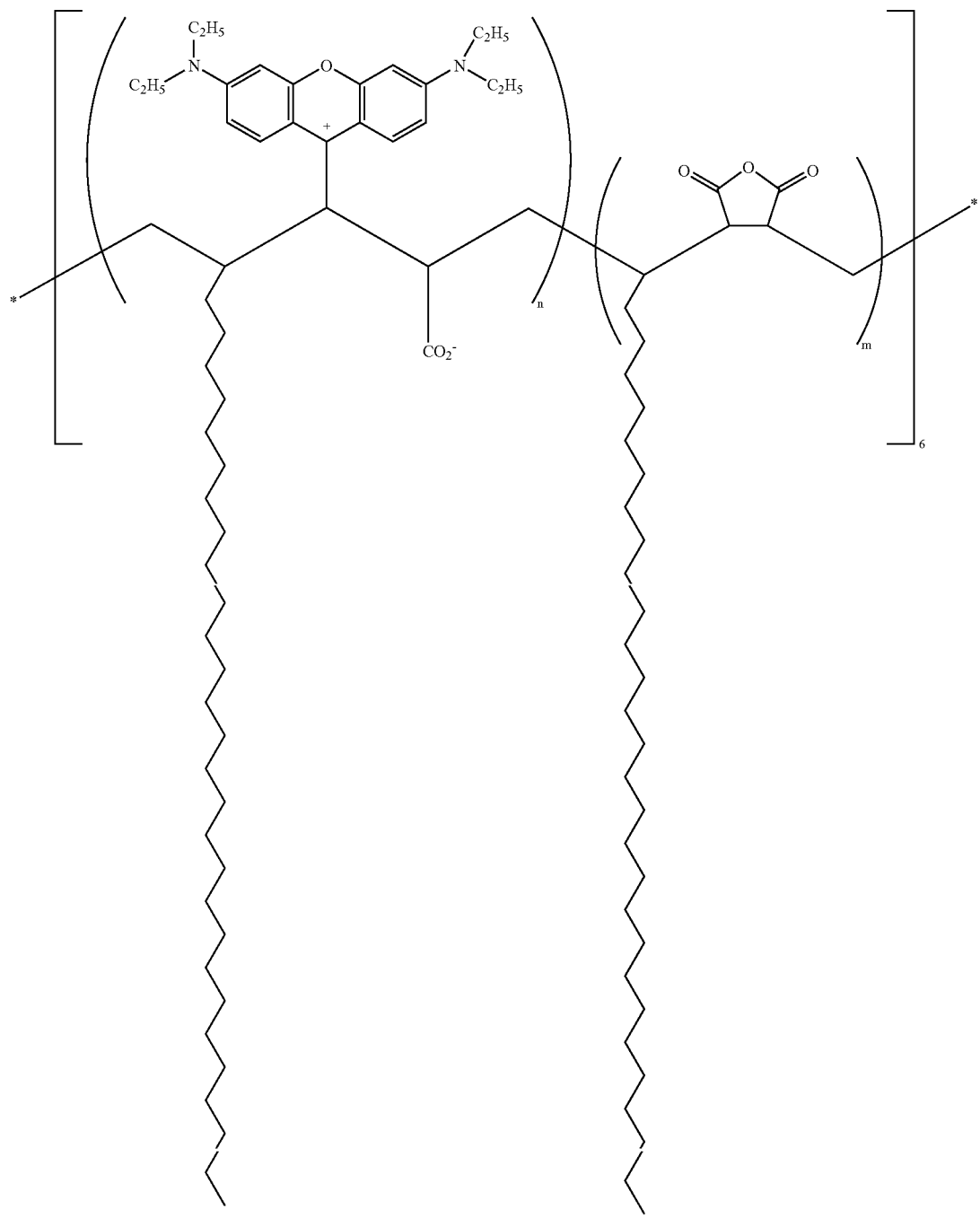
wherein n is 1 to 1,000 and wherein m is 1 to 1,000.

13. A compound of the formula

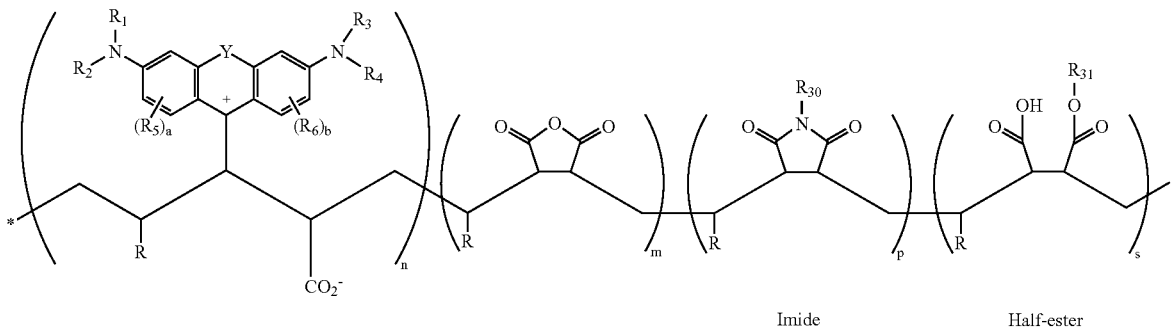

Imide    Half-ester

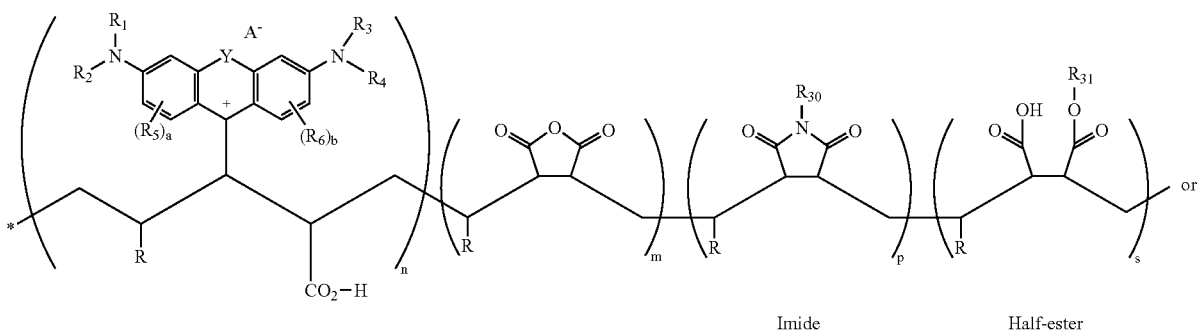

Imide    Half-ester or

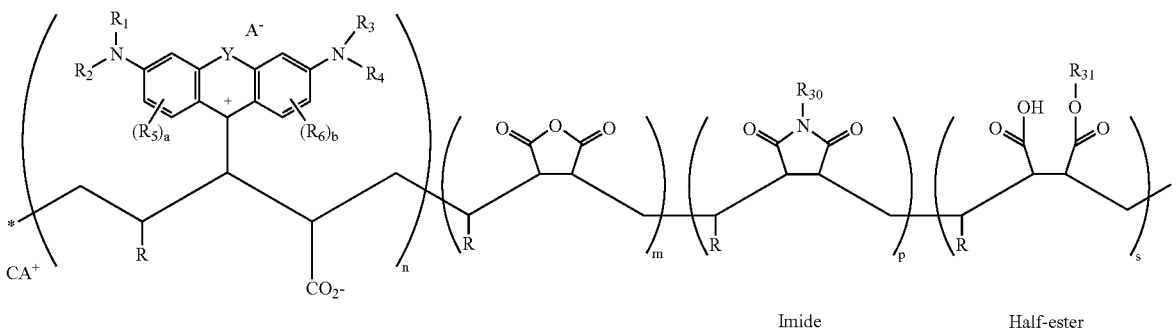

Imide    Half-ester wherein $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure;

wherein a and b each, independently of the others, is an integer which is 0, 1, 2, or 3;

wherein $R_5$ and $R_6$ are hydrogen or alkyl;

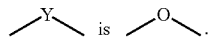 is 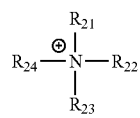.

wherein A is an anion selected from the group consisting of $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_3^-$, $NO_3^-$, $HCOO^-$, $CH_3COO^-$, $H_2PO_4^-$, $HPO_4^{2-}$, $SCN^-$, $BF_4^-$, $ClO_4^-$, $SSO_3^-$, $PF_6^-$, and $SbCl_6^-$;

wherein CA is either a hydrogen atom an alkali metal cation, or a quaternary amine cation of the formula $$R_{24} - \overset{R_{21}}{\underset{R_{23}}{\overset{\oplus}{N}}} - R_{22}$$

wherein each of $R_{21}$, $R_{22}$, $R_{23}$, and $R_{24}$ are independently selected from an alkyl group having 1 to 6 carbon atoms;

wherein R is (i) an alkyl group, (ii) an aryl group, (iii) an arylalkyl group, (iv) an alkylaryl group, (v) an alkoxy group, (vi) an acetate group, or (vii) a co-polymer of maleic anhydride;

wherein $R_{30}$ and $R_{31}$ each, independently of the other, is an alkyl group, an aryl group, an alkylaryl group, or an arylalkyl group; and wherein n is 1 to 1,000, m is 1 to 1,000, p is 1 to 1,000 and s is 1 to 1,000.

* * * * *